United States Patent
Mori et al.

(10) Patent No.: US 7,416,151 B2
(45) Date of Patent: *Aug. 26, 2008

(54) WEBBING RETRACTOR

(75) Inventors: Shinji Mori, Aichi-ken (JP); Teruhiko Koide, Aichi-ken (JP); Fuminori Komiya, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 13 days.

This patent is subject to a terminal disclaimer.

(21) Appl. No.: 11/483,730

(22) Filed: Jul. 11, 2006

(65) Prior Publication Data

US 2006/0249615 A1    Nov. 9, 2006

Related U.S. Application Data

(62) Division of application No. 10/636,975, filed on Aug. 8, 2003, now Pat. No. 7,090,161.

(30) Foreign Application Priority Data

Aug. 12, 2002    (JP) .............................. 2002-235085

(51) Int. Cl.
    B65H 75/48    (2006.01)

(52) U.S. Cl. .................................... 242/390.8; 280/807
(58) Field of Classification Search ............. 242/390.8, 242/390.9; 280/806, 807
    See application file for complete search history.

(56) References Cited

U.S. PATENT DOCUMENTS 6,494,395 B1    12/2002    Fujii et al.

*Primary Examiner*—William A Rivera
(74) *Attorney, Agent, or Firm*—Roberts Mlotkowski Safran & Cole, P.C.; Thomas W. Cole

(57) ABSTRACT

A webbing retractor has two torque transmitting routes for taking-up, such that rapid and reliable taking-up, and gentle taking-up are possible. When an engaging claw of a pawl restricts rotation of a ratchet plate, due to planetary gears rotating around a sun gear, rotation is transmitted from a drive gear to a carrier plate. On the other hand, when restriction of rotation of the ratchet plate is released, a clutch spring tightens around a tube portion of the carrier plate while rotation of the drive gear pulls one peripheral direction end of the clutch spring in a direction of rotation thereof. Frictional resistance between the tube portion and the clutch spring is increased, and rotation is transmitted from the drive gear to the carrier plate.

6 Claims, 15 Drawing Sheets

# WEBBING RETRACTOR

CROSS-REFERENCE TO RELATED APPLICATION

This application claims priority under 35 USC 119 from Japanese Patent Application No. 2002-235085, the disclosure of which is incorporated by reference herein.

BACKGROUND OF THE INVENTION

1. Field of the Invention

The present invention relates to a webbing retractor which structures a seat belt device for restraining, by an elongated, strip-shaped webbing belt, the body of a vehicle occupant who is seated in a seat of a vehicle or the like.

2. Description of the Related Art

A seat belt device which restrains, by an elongated, strip-shaped webbing belt, the body of a vehicle occupant who is seated in a seat of a vehicle, is equipped with a webbing retractor which is fixed to the vehicle body at the side of the seat. The webbing retractor has a spool (take-up shaft) whose axial direction runs, for example, substantially along the longitudinal direction of the vehicle. The proximal end side, in the longitudinal direction, of the webbing belt is anchored at the spool. The spool can take up the webbing belt in the form of a roll around the outer peripheral portion of the spool. When the seat belt device is not being used, the webbing belt can be taken-up and accommodated on the outer peripheral portion of the spool.

An urging member, such as a spiral spring or the like which urges the spool in a take-up direction in which the spool takes up the webbing belt, is provided at the webbing retractor. Due to the urging force of this urging member, the webbing belt is taken up and accommodated. In the state in which the webbing belt is applied to the body of a vehicle occupant, slack or the like of the webbing belt is eliminated by the urging force of the urging member.

On the other hand, a mechanism has been conceived of which, when the vehicle rapidly decelerates or the like, takes-up a given amount of the webbing belt onto the spool, so as to eliminate the slight looseness called "slack", and increase the force by which the webbing belt restrains the body of the vehicle occupant, and even more reliably hold the body of the vehicle occupant. In this type of mechanism, generally, the state of rapid deceleration of the vehicle is detected by an acceleration sensor, and the mechanism forcibly rotates the spool in the take-up direction on the basis of an electric signal from the acceleration sensor.

In contrast, a structure has been thought of in which the distance to another vehicle or an obstacle ahead is detected by a distance sensor or the like. When the distance to the vehicle or the obstacle ahead is less than a given value, a motor is operated, and the spool is rotated in the take-up direction by the torque of the motor.

When the state of rapid deceleration of the vehicle such as that described above is cancelled, this structure, which rotates the spool by the driving force of a motor, can be used to rotate the spool by a predetermined amount in the pull-out direction so as to loosen the webbing belt, thereby lessening the pressing sensation imparted to the vehicle occupant.

However, in a usual state, when the pressing sensation or the releasing sensation is suddenly changed by loosening or tightening the webbing belt suddenly by the driving force of the motor, the vehicle occupant conversely has an uncomfortable sensation. Thus, it is desirable to, at usual times, have the motor drive the spool relatively gently at the time when the motor causes the spool to rotate.

SUMMARY OF THE INVENTION

In view of the aforementioned, an object of the present invention is to provide a webbing retractor having a torque control mechanism which enables both rapid and reliable transmission of torque, and gentle transmission of torque.

A first aspect of the present invention is a webbing retractor for an elongated, strip-shaped webbing belt used for application to a body of a vehicle occupant riding in a vehicle, the webbing retractor comprising: a take-up shaft which is held so as to be rotatable, and to which one end of the webbing belt is anchored, and which winds the webbing belt around the take-up shaft; a driving mechanism which has an output shaft, and which, by driving and rotating the output shaft in a predetermined direction, rotates the take-up shaft at least in a take-up direction; and a power transmitting mechanism which transmits rotation of the output shaft to the take-up shaft, the power transmitting mechanism having: a first connecting mechanism for transmitting, to the take-up shaft, rotation corresponding to the rotation of the output shaft, mechanical connection of the first connecting mechanism to the take-up shaft being switchable; and a second connecting mechanism connecting the output shaft and the take-up shaft by friction so as to transmit the rotation of the output shaft to the take-up shaft, wherein when the first connecting mechanism is switched so as to connect to the take-up shaft, the first connecting mechanism transmits rotation to the take-up shaft preferentially over transmission of power by the second connecting mechanism.

A second aspect of the present invention is a webbing retractor for an elongated, strip-shaped webbing belt used for application to a body of a vehicle occupant riding in a vehicle, the webbing retractor comprising: a take-up shaft which is held so as to be rotatable, and to which one end of the webbing belt is anchored, and which winds the webbing belt around the take-up shaft; a driving mechanism which has an output shaft, and which, by driving and rotating the output shaft in a predetermined direction, rotates the take-up shaft at least in a take-up direction; wherein a torque control mechanism for transmitting rotation of the output shaft to the take-up shaft, and the torque control mechanism can directly mechanically connect the output shaft to the take-up shaft, and the torque control mechanism directly connects the output shaft to the take-up shaft so as to transmit torque of the output shaft to the take-up shaft so as to rotate the take-up shaft, and the torque control mechanism can frictionally connect the output shaft and the take-up shaft, and in a state in which direct connection is released, when frictional force becomes greater than or equal to a predetermined magnitude as the output shaft rotates, the torque control mechanism connects the output shaft and the take-up shaft by frictional force.

In accordance with the webbing retractor having the above-described structure, the proximal end side of the webbing belt is anchored on the take-up shaft. When the webbing belt is not being used for example, the webbing belt is taken-up and accommodated substantially in the form of a roll around the take-up shaft from the proximal end side of the webbing belt.

In this state, when the webbing belt is pulled toward the distal end side thereof, the webbing belt, which is taken-up on the take-up shaft, is pulled out while the take-up shaft rotates in the pull-out direction.

Moreover, in this state in which the webbing belt is pulled out, when the take-up shaft is rotated in the take-up direction, the webbing belt is taken-up onto the take-up shaft from the proximal end side thereof, and the webbing belt is again accommodated.

In the present webbing retractor, the torque control mechanism is provided between the output shaft of the driving mechanism and the take-up shaft. In the state in which the torque control mechanism directly connects the output shaft and the take-up shaft, the torque of the output shaft, which rotates due to the driving force of the driving mechanism, is transmitted to the take-up shaft. Accordingly, if the direction of rotation of the output shaft is a direction corresponding to the take-up direction of the take-up shaft, the rotation of the output shaft is transmitted to the take-up shaft, and the webbing belt is taken-up onto the take-up shaft.

In contrast, when the torque control mechanism cancels the aforementioned state of direct connection, and, in this state, the driving force of the driving mechanism rotates the output shaft, frictional force, which increases as the output shaft rotates, arises. When this frictional force becomes greater than or equal to a given magnitude, the output shaft and the take-up shaft are connected by frictional force, and the rotation of the output shaft is transmitted to the take-up shaft.

Here, the connection due to the aforementioned frictional force connects the output shaft and the take-up shaft after the frictional force has become greater than or equal to a given magnitude. Thus, as compared with the aforementioned state of direct connection, a time loss arises until the rotation of the output shaft is transmitted to the take-up shaft. Moreover, loss in the transmission of the torque also arises due to the friction. In this way, as compared with the state of direct connection, the rotation of the output shaft can be transmitted relatively gently without being transmitted suddenly to the take-up shaft.

Accordingly, for example, when the vehicle rapidly decelerates or the like, in the state of direct connection, the driving mechanism is driven and the take-up shaft is rotated suddenly in the take-up direction. In this way, the slight looseness in the webbing belt (so-called "slack") can be eliminated rapidly, and the body of the vehicle occupant can be held (restrained) quickly and more reliably.

Further for example, in a usual case or the like, the state of direct connection is released, and connection is switched to connection by frictional force, and the driving force of the driving mechanism is transmitted gently to the take-up shaft. It is thereby possible to prevent shock due to sudden transmission of torque from being transmitted to the members structuring the torque control mechanism, as well as to other members.

The torque control mechanism may have: a first rotating body mechanically connected to the output shaft, and rotating by receiving rotation of the output shaft; a second rotating body mechanically connected to the take-up shaft, and transmitting rotation of the second rotating body to the take-up shaft; a first rotation transmitting member provided at one of the first rotating body and the second rotating body, and able to abut another of the first rotating body and the second rotating body, and rotating together with the first rotating body, and under a predetermined condition, the first rotation transmitting member pushes the second rotating body in a direction of rotation of the first rotating body; and a second rotation transmitting member which, by friction, rotates the second rotating body such that rotation of the second rotating body follows rotation of the first rotating body, and which slidingly contacts one of the first rotating body and the second rotating body along the direction of rotation of the first rotating body, and a portion of the second rotation transmitting member engages with another of the first rotating body and the second rotating body, and the second rotation transmitting member is provided such that friction between the second rotation transmitting member and the one of the first rotating body and the second rotating body increases as an amount of relative rotation between the first rotating body and the second rotating body increases.

In the webbing retractor having the above-described structure, when the driving mechanism operates and the output shaft rotates due to the driving force of the driving mechanism, the first rotating body which structures the torque control mechanism rotates. In this state, if the first rotation transmitting member, which is provided at one of the first rotating body and the second rotating body, abuts the other in the direction of rotation of the first rotating body, and a state in which pressing is possible under a predetermined condition arises, the first rotation transmitting member rotates together with the rotation of the first rotating body, and further, the first rotation transmitting member pushes the second rotating body in the direction of rotation of the first rotating body.

In this state, the rotation of the first rotating body is immediately transmitted to the second rotating body. Thus, in this state, the driving force of the driving mechanism can be rapidly transmitted to the take-up shaft and can rotate the take-up shaft.

In contrast, in cases other than under the aforementioned predetermined condition, transfer of rotation from the first rotating body to the second rotating body via the first rotation transmitting member is not carried out. However, when the first rotating body rotates due to the driving force of the driving mechanism, and relative rotational displacement thereby arises between the first rotating body and the second rotating body, the second rotation transmitting member, a portion of which engages with the other of the first rotating body and the second rotating body, is rotated and displaced in the direction of displacement of the other with respect to the one.

Here, the second rotation transmitting member is provided in a state of slidingly contacting one of the first rotating body and the second rotating body. Thus, friction arises between the second rotation transmitting member and the one due to the second rotation transmitting member being rotated and displaced with respect to the one as described above. This friction increases as the amount of rotation and displacement of the second rotation transmitting member with respect to the one increases. Thus, when the frictional force becomes greater than or equal to a given amount, the second rotation transmitting member rotates the second rotating body, with which one portion of the second rotation transmitting member is engaged or with which the second rotation transmitting member slidingly contacts, in the direction of rotation of the first rotating body.

In this way, in the present webbing retractor, rotation of the first rotating body can be transmitted to the second rotating body by the second rotation transmitting member as well, separately from the first rotation transmitting member. Here, in the transmission of rotation at the first rotating body, the first rotation transmitting member, which receives rotation of the first rotating body, pushes the second rotating body. In contrast, in the transmission of rotation at the second rotation transmitting member, rotation is transmitted from the first rotating body to the second rotating body due to the frictional force between the second rotation transmitting member and one of the first rotating body and the second rotating body becoming a given amount or more.

Thus, in the transmission of rotation at the second rotation transmitting member, there is a delay of a predetermined time from the start of rotation of the first rotating body and there is a loss in the transmission of rotation due to the friction, which is different than in the transmission of rotation at the first rotating body. In this way, sudden transmission of rotation from the first rotating body to the second rotating body is not carried out, and the rotation is transmitted relatively gently.

Accordingly, for example, when the vehicle rapidly decelerates or the like, the driving force of the driving mechanism is transmitted to the take-up shaft via the first rotation transmitting member, and the take-up shaft is rapidly rotated in the take-up direction. In this way, the slight looseness in the webbing belt (so-called "slack") can be eliminated rapidly, and the body of the vehicle occupant can be held (restrained) quickly and more reliably.

Further, for example, in a usual case or the like, the state of direct connection is released, and connection is switched to connection by frictional force, and the driving force of the driving mechanism is transmitted gently to the take-up shaft. It is thereby possible to prevent shock due to sudden transmission of torque from being transmitted to the members structuring the torque control mechanism, such as the first rotation transmitting member, the second rotating body, and the like.

Moreover, the first rotation transmitting member may be provided so as to be swingable, and due to centrifugal force generated by rotation of the first rotating body in a predetermined direction at a speed that is substantially equal to or greater than a predetermined speed.

In the webbing retractor of the above-described structure, when the first rotating body rotates in a predetermined direction at a predetermined speed or greater, the first rotation transmitting member swings due to the centrifugal force generated by the rotation of the first rotating body. Due to this swinging, the first rotation transmitting member is set in a state in which pushing is possible, and rotation is transmitted via the first rotation transmitting member.

In this way, in the present webbing retractor, it is possible to switch between transmission of rotation via the first rotation transmitting member and transmission of rotation via the second rotation transmitting member, merely by controlling the direction of rotation and the rotational speed of the first rotating body, i.e., the driving direction (forward rotational driving or reverse rotational driving) and the driving speed of the driving mechanism. Thus, control for switching between transmission of rotation via the first rotation transmitting member and transmission of rotation via the second rotation transmitting member is easy.

The webbing retractor may further comprise a detector which detects at least one of a traveling state of a vehicle, a distance to an obstacle positioned ahead of the vehicle, and whether or not the webbing belt is applied to a body of a vehicle occupant, and which outputs a signal corresponding to results of detection; and a control unit which controls rotation of the driving mechanism on the basis of the signal from the detector. The control unit may, on the basis of the signal from the detector, control switching between direct connection of the output shaft to the take-up shaft and releasing of the direct connection.

In the webbing retractor having the above-described structure, any of the traveling state of the vehicle, the distance to an obstacle positioned ahead of the vehicle, and whether or not the webbing belt is applied to the body of the vehicle occupant, is detected by the detector.

Further, the signal, which is outputted from the detector in accordance with any of the traveling state of the vehicle, the distance to the obstacle positioned ahead of the vehicle, and whether or not the webbing belt is applied to the body of the vehicle occupant, is inputted to the control unit. Here, the control unit drives the driving mechanism when the signal inputted to the control unit is a predetermined signal, i.e., a signal corresponding to a case in which the vehicle is in a state of rapid deceleration, a signal in a case in which the distance to an obstacle positioned ahead of the vehicle is less than or equal to a predetermined value, a signal in a case in which the webbing belt is applied to the body of a vehicle occupant, and the like.

Moreover, in this state, the torque control mechanism assumes the state of direct connection, and sudden transmission of rotation, in which there is little time loss or the like, from the output shaft to the take-up shaft is carried out.

DETAILED DESCRIPTION OF THE INVENTION

Figure 1:
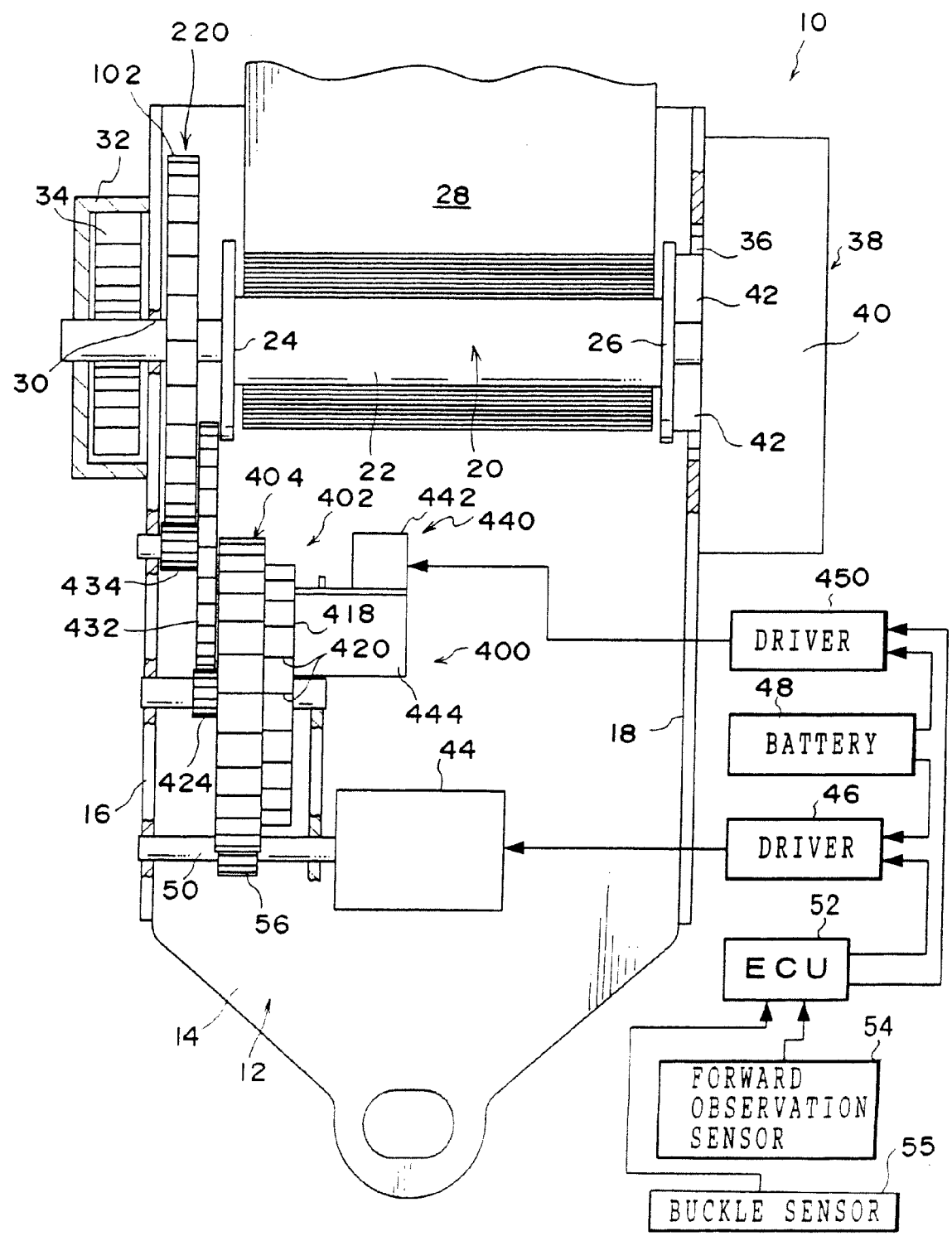
FIG. 1 is a front view showing the outline of the structure of a webbing retractor relating to a first embodiment of the present invention.

In the webbing retractor of the first aspect, the first connecting mechanism has a first rotating body which is driven to rotate by the rotation of the output shaft; a second rotating body for transmitting rotation to the take-up shaft by receiving rotation of the first rotating body; and a gear train which is disposed so as to be able to transmit rotation of the first rotating body to the second rotating body, when the first connecting mechanism is switched so as to connect to the take-up shaft. The gear train has at least one planetary gear, and due to the planetary gear revolving, the rotation of the first rotating body is transmitted to the second rotating body. Moreover, the webbing retractor further comprises a switching mechanism for switching connection of the first connecting mechanism to the take-up shaft, wherein the gear train has a sun gear around which the planetary gear can revolve, and due to the switching mechanism being switched such that rotation of the sun gear is restrained, the planetary gear revolves, and the rotation of the first rotating body is transmitted to the second rotating body.

Moreover, in an embodiment, the second connecting mechanism has: a first rotating body which is driven to rotate by the rotation of the output shaft; a second rotating body for transmitting rotation to the take-up shaft by receiving rotation of the first rotating body; and a friction member attached to one of the first rotating body and the second rotating body between the first rotating body and the second rotating body so as to be able to slidingly contact the other of the first rotating body and the second rotating body, the friction member transmitting rotation from the first rotating body to the second rotating body by frictional force. The first rotating body and the second rotating body are supported so as to be able to rotate relative to one another, and a friction member is mounted so as to increase frictional force when the first rotating body rotates relative to the second rotating body. The first rotating body has a cylindrical inner surface, and the second rotating body has a cylindrical outer surface, and the inner surface of the first rotating body and the outer surface of the second rotating body are disposed so as to face one another, and the friction member is attached so as to be positioned between the inner surface and the outer surface. The friction member is shaped as a ring having ends. The friction member is formed of a spring material.

Further, in another embodiment, the first connecting mechanism has: a first rotating body which is driven to rotate by the rotation of the output shaft; a second rotating body for transmitting rotation to the take-up shaft by receiving rotation of the first rotating body; and a rotation transmitting mechanism for transmitting rotation of the first rotating body to the second rotating body, the rotation transmitting mechanism having a structure which operates so as to transmit the rotation of the first rotating body to the second rotating body when the first rotating body is rotated at a speed that is substantially greater than a predetermined rotational speed. The rotation transmitting mechanism is formed at the first rotating body and has a structure which engages with a portion of the second rotating body due to centrifugal force generated by the rotation of the first rotating body. The rotation transmitting mechanism has a structure for adjusting the predetermined rotational speed.

Hereinafter, embodiments of the present invention will be described in detail with reference to the drawings.

Structure of First Embodiment (Overall Structure of Webbing Retractor 10)

A front view showing the overall structure of a webbing retractor 10 relating to the present embodiment is shown in FIG. 1. As shown in FIG. 1, the webbing retractor 10 has a frame 12. The frame 12 has a back plate 14 which is substantially plate-shaped. The webbing retractor 10 is mounted to a vehicle body by the back plate 14 being fixed to the vehicle body by unillustrated fasteners such as bolts or the like. A pair of leg plates 16, 18 extend parallel to one another from the transverse direction ends of the back plate 14. A spool 20, which serves as a take-up shaft and which is manufactured by die casting or the like, is disposed rotatably between the leg plates 16, 18.

The spool 20 is constituted by a spool main body 22 and a pair of flange portions 24, 26, and is formed in a drum-shape on the whole. The spool main body 22 is substantially hollow and cylindrical. The pair of flange portions 24, 26 are formed in substantial disc shapes at the end portions of the spool main body 22.

The proximal end portion of a webbing belt 28, which is formed in the shape of an elongated strip, is fixed between the flange portions 24, 26. When the spool 20 is rotated in one direction around the axis thereof, the webbing belt 28 is taken-up in the form of a roll onto the outer peripheral portion of the spool main body 22 from the proximal end side of the webbing belt 28. Further, if the webbing belt 28 is pulled from the distal end side thereof, the webbing belt 28, which is taken-up on the outer peripheral portion of the spool main body 22, is pulled out. Accompanying this, the spool 20 rotates in the direction opposite to the direction of rotation at the time of taking-up the webbing belt 28. (Hereinafter, for convenience of explanation, the direction of rotation at the time of taking-up the webbing belt 28 will be called the "take-up direction", and the direction of rotation of the spool 20 at the time when the webbing belt 28 is pulled out will be called the "pull-out direction".)

The flange portion 24 one end side of the spool 20, which is at the side opposite from the flange portion 26 side of the spool 20, passes substantially coaxially through a circular hole 30 which is formed in the leg plate 16, and projects to the exterior of the frame 12. A case 32 is disposed at the outer side of the frame 12 at the leg plate 16 side. The case 32 is disposed so as to oppose the leg plate 16 along the axial direction of the spool 20, and is fixed to the leg plate 16. The case 32 is, on the whole, open toward the leg plate 16 side. The one end side of the spool 20 which passes through the circular hole 30 enters into the inner side of the case 32, and is rotatably supported by the case 32.

Moreover, a spiral spring 34 is disposed within the case 32. The end portion, at the outer side in the direction of the spiral, of the spiral spring 34 is anchored on the case 32. The end portion, at the inner side in the direction of the spiral, of the spiral spring 34 is anchored on the spool 20. When the spool 20 is rotated in the pull-out direction from a neutral state in which no particular load is applied, urging force in the take-up direction arises, and the spiral spring 34 urges the spool 20 in the take-up direction. Accordingly, basically, when the tensile force applied to the webbing belt 28 for pulling the webbing belt 28 out from the spool 20 is released, the urging force of the spiral spring 34 rotates the spool 20 in the take-up direction, and the webbing belt 28 is taken-up onto the spool 20.

On the other hand, the flange portion 26 side other end side of the spool 20, which is opposite the flange portion 24 side thereof, passes substantially coaxially through an internal teeth ratchet hole 36 formed in the leg plate 18, and projects at the exterior of the frame 12. A lock mechanism 38 is provided at the outer side of the frame 12 at the leg plate 18 side. The lock mechanism 38 has a case 40. The case 40 is disposed so as to oppose the leg plate 18 along the axial direction of the spool 20, and is fixed to the leg plate 18.

Respective members forming the lock mechanism 38, such as an inertial plate or an external gear, an acceleration sensor, and the like (all of which are unillustrated), are accommodated at the inner side of the case 40. Due to the spool 20 rotating suddenly in the take-up direction, the inertial plate within the case 40 rotates relative to the spool 20, or the acceleration sensor detects a state of rapid deceleration of the vehicle and the inertial plate within the case 40 is forcibly rotated relative to the spool 20.

A pair of lock plates 42 are provided at the inner side of the ratchet hole 36. The lock plates 42 are supported by a lock base which is provided within the case 40 and rotates integrally with the spool 20. When the inertial plate within the case 40 rotates in the pull-out direction relative to the lock base, the lock plates 42 are guided by guide portions formed at the lock base, and approach the inner peripheral portion of the ratchet hole 36. External teeth formed at the lock plates 42 mesh with the internal teeth formed at the inner peripheral portion of the ratchet hole 36.

Due to the external teeth formed at the lock plates 42 meshing with the internal teeth formed at the inner peripheral portion of the ratchet hole 36 in this way, rotation of the lock base in the pull-out direction is restricted, and accordingly, rotation of the spool 20 is restricted.

On the other hand, a motor 44 serving as a driving mechanism is disposed beneath the spool 20 between the leg plate 16 and the leg plate 18. The motor 44 is electrically connected via a driver 46 to a battery 48 mounted in the vehicle. Due to current from the battery 48 flowing to the motor 44 via the driver 46, the motor 44 rotates an output shaft 50 in the forward direction or the reverse direction. The driver 46 is connected to an ECU 52 which is formed by a microcomputer or the like and serves as a control unit. The ECU 52 is connected to a forward observation sensor 54 and a buckle sensor 55, each of which is a detector.

The forward observation sensor 54 is provided in the vicinity of the front end portion of the vehicle, and emits infrared rays toward the region in front of the vehicle, and receives the infrared rays which have been reflected by another vehicle or an obstacle which has stopped or is traveling in front of the vehicle. (Hereinafter, such objects, including vehicles which are traveling or have stopped, will be called "obstacles" for convenience of explanation.) The ECU 52 computes the distance to the obstacle ahead on the basis of the time required for the forward observation sensor 54 to receive light from the time the forward observation sensor 54 emitted the infrared rays.

On the other hand, the buckle sensor 55 is provided at a buckle device (not illustrated) which is disposed at the side of the seat opposite the side at which the webbing retractor 10 is provided. The buckle device is for holding a tongue plate (not illustrated), which is provided at a longitudinal direction intermediate portion of the webbing belt 28, when the vehicle occupant applies the webbing belt 28 to himself/herself. The buckle sensor 55 detects whether or not the tongue plate has been inserted in the buckle device and a latch (not illustrated) provided in the buckle device has engaged with the tongue plate so that the tongue plate is in a state of being held. When the tongue plate is in a held state, the buckle sensor 55 outputs a predetermined electric signal to the ECU 52.

On the basis of the electric signals outputted from the forward observation sensor 54 and the buckle sensor 55, the ECU 52 operates the driver 46 and controls the motor 44.

(Structure of Torque Control Mechanism 400)

Figure 2:
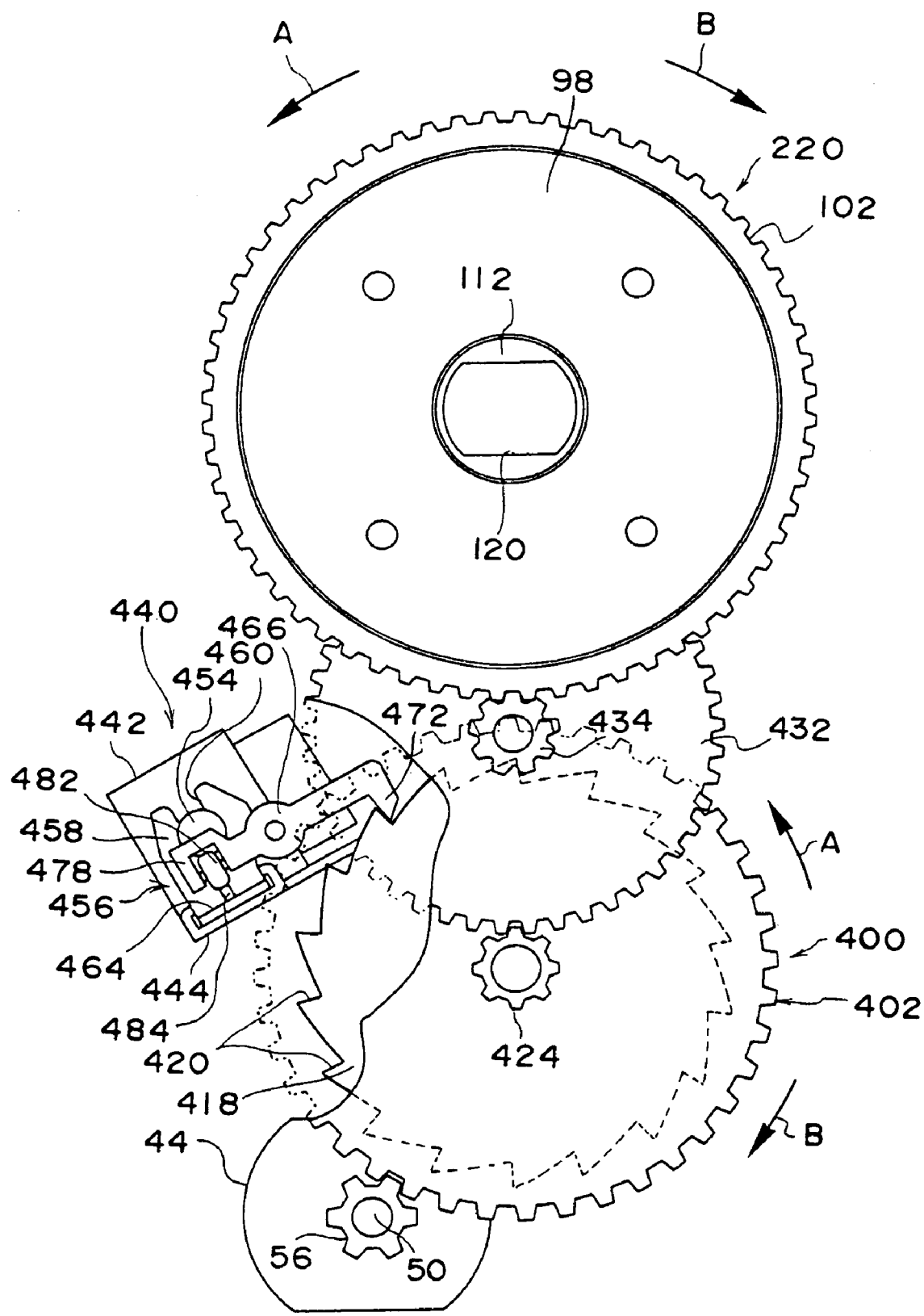
FIG. 2 is a side view showing a route of transmission of rotation from a driving mechanism of the webbing retractor relating to the first embodiment of the present invention.
Figure 3:
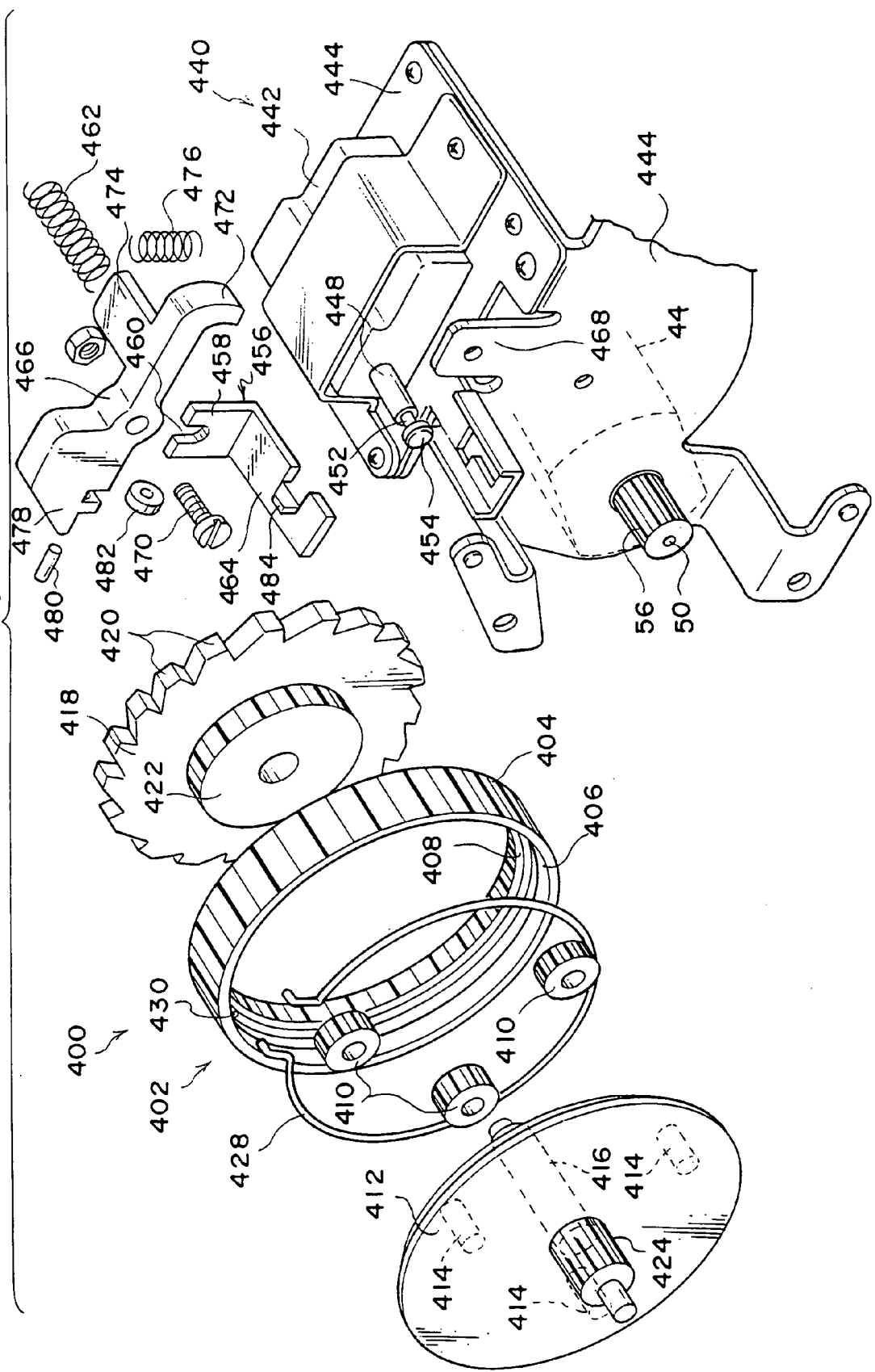
FIG. 3 is an exploded perspective view of a torque control mechanism applied to the first embodiment of the present invention.

On the other hand, as shown in FIGS. 1 and 2, the present webbing retractor 10 has a control gear 402 which structures a torque control mechanism 400. As shown in FIG. 3, the control gear 402 has a drive gear 404 serving as a first rotating body. The drive gear 404 has an outer tube portion 406 which is substantially hollow cylindrical and whose axial direction dimension is relatively short. As shown in FIGS. 1 and 2, external teeth, of a number which is sufficiently greater than that of a gear 56 which is provided coaxially and integrally with the output shaft 50 of the motor 44, are formed at the outer peripheral portion of the outer tube portion 406, and mesh with the gear 56.

Figure 4:
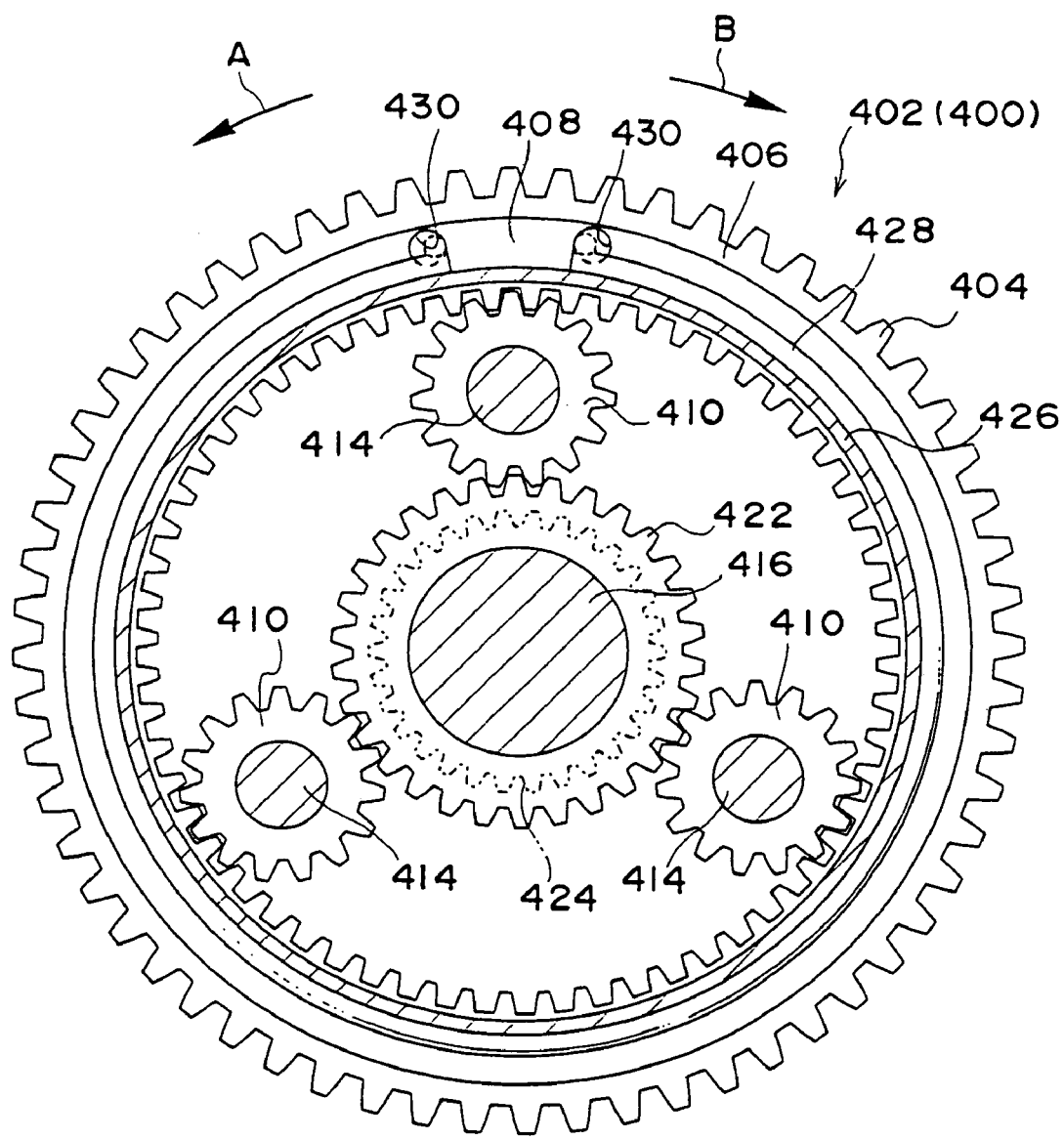
FIG. 4 is a front view showing the structure of a control gear structuring the torque control mechanism applied to the first embodiment of the present invention.

As shown in FIGS. 3 and 4, an inner tube portion 408, whose axial direction dimension is shorter than that of the outer tube portion 406, is formed coaxially and integrally with the outer tube portion 406 at the inner side of the outer tube portion 406. Internal teeth are formed at the inner peripheral portion of the inner tube portion 408. A plurality (three in the present embodiment) of planetary gears 410, which serve as first connecting members and which are disposed at the radial direction inner side of the inner tube portion 408, mesh with the internal teeth of the inner tube portion 408.

Figure 5:
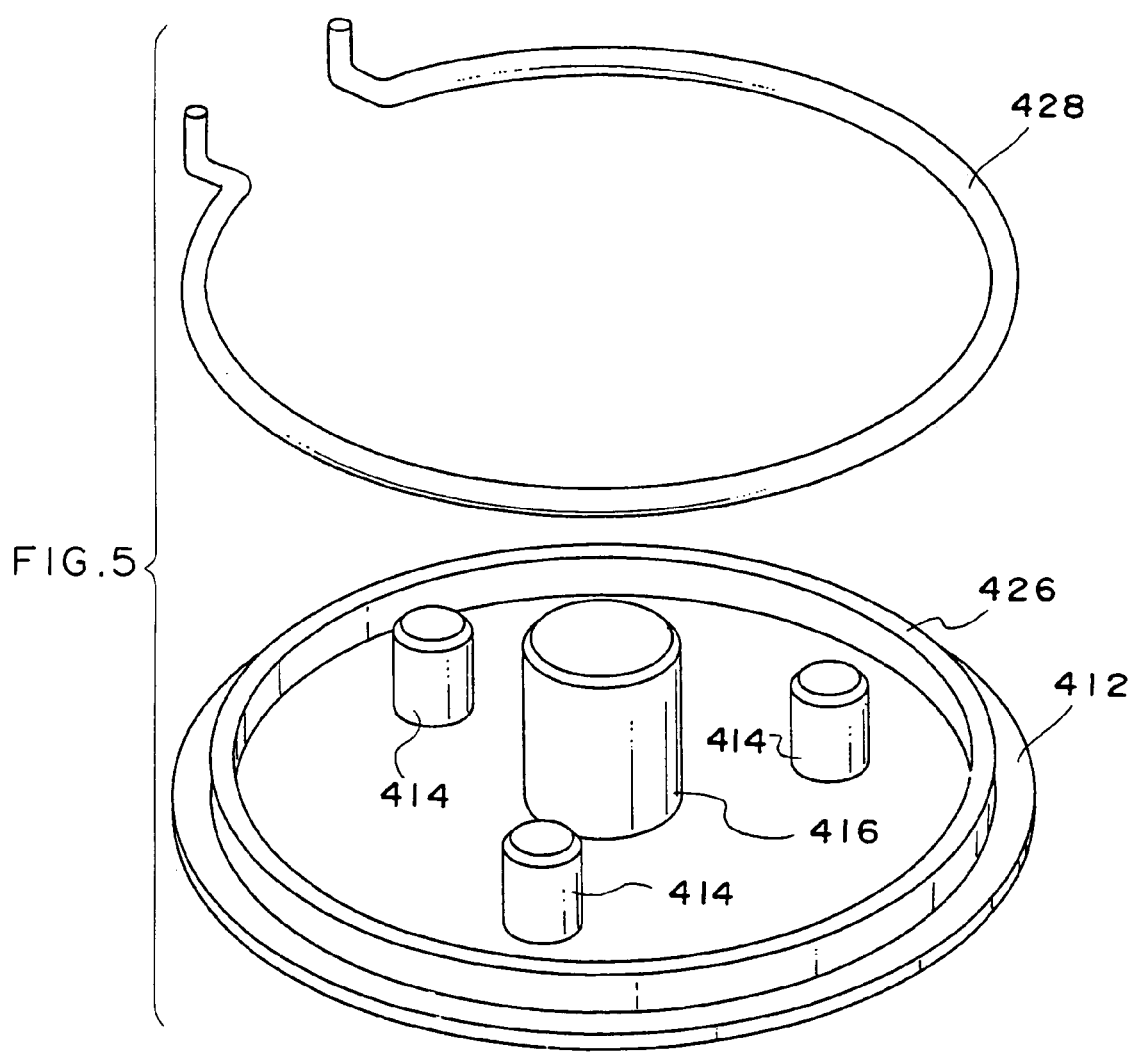
FIG. 5 is a perspective view showing the rear surface side structure of a carrier plate which serves as a second rotating body structuring the control gear.

A carrier plate 412 serving as a second rotating body is disposed at the leg plate 18 side, in the axial direction, of the planetary gears 410. As shown in FIGS. 3 through 5, the carrier plate 412 is formed in the shape of a disc which is coaxial with the outer tube portion 406. The planetary gears 410 are pivotally supported at respective carrier shafts 414 which stand erect from the leg plate 16 side surface, in the axial direction, of the carrier plate 412.

A center shaft 416 is formed at the substantial center of the carrier plate 412, so as to project in the same direction as the projecting direction of the carrier shafts 414. The dimension by which the center shaft 416 projects is longer than that of the carrier shafts 414. A ratchet plate 418, at whose outer peripheral portion a plurality of ratchet teeth 420 are formed, is pivotally supported at the distal end side of the center shaft 416.

As shown in FIG. 3, a sun gear 422 having external teeth is formed coaxially and integrally with the ratchet plate 418 at the leg plate 16 side surface, in the axial direction, of the ratchet plate 418. The center shaft 416 passes through the sun gear 422, and pivotally supports the ratchet plate 418 and the sun gear 422. The planetary gears 410 mesh with the sun gear 422.

A gear 424 having external teeth is formed coaxially and integrally with the carrier plate 412 at the leg plate 16 side surface, in the axial direction, of the carrier plate 412. As shown in FIGS. 1 and 2, the gear 424 meshes with a gear 432 disposed at a side of (above) the gear 424. The gear 432 has more teeth than the gear 424. Accordingly, the rotation of the gear 424 is decelerated by being transmitted to the gear 432. Moreover, a gear 434, which has a number of teeth which is sufficiently smaller than that of the gear 432, is formed coaxially and integrally with the gear 432. The gear 434 meshes with an external gear 102 of a clutch 220 which will be described later.

As shown in FIG. 5, a tube portion 426 is formed coaxially and integrally with the carrier plate 412 at the leg plate 18 side surface, in the axial direction, of the carrier plate 412. The tube portion 426 is formed in the shape of a hollow cylinder whose axial direction dimension is relatively short. The inner diameter of the tube portion 426 is of a size such that the planetary gears 410, which are supported at the respective carrier shafts 414, are disposed at the inner side of the tube portion 426, and such that the tube portion 426 does not interfere with the planetary gears 410.

As shown in FIGS. 4 and 5, a clutch spring 428, which serves as a second connecting member, is provided at the outer peripheral portion of the tube portion 426. The clutch spring 428 is formed in a substantial ring shape on the whole. The inner diameter of the clutch spring 428 is substantially equal to the outer diameter of the tube portion 426. Further, one portion of the clutch spring 428 along the peripheral direction thereof is cut. Accordingly, the clutch spring 428 is not a completely annular form, and ends thereof exist along the peripheral direction.

As shown in FIG. 4, the both peripheral direction ends of the clutch spring 428 are bent toward the outer side in the radial direction of the clutch spring 428, and thereafter, are bent toward the leg plate 18 side, in the axial direction, of the clutch spring 428. The ends of the clutch spring 428, which are bent toward the leg plate 18 side in the axial direction, are inserted into a pair of holes 430 which are formed at the leg plate 16 side end surface, in the axial direction, of the inner tube portion 408.

The inner diameter of the holes 430 is sufficiently larger than the outer diameter of the cross-section of the clutch spring 428. The both ends of the clutch spring 428 are fit with play in the holes 430.

On the other hand, as shown in FIG. 2, a control solenoid device 440, which, together with the control gear 402, forms the torque control mechanism 400, is disposed at the side of the control gear 402 which is structured as described above. The control solenoid device 440 has a substantially box-shaped solenoid housing 442.

Figure 6:
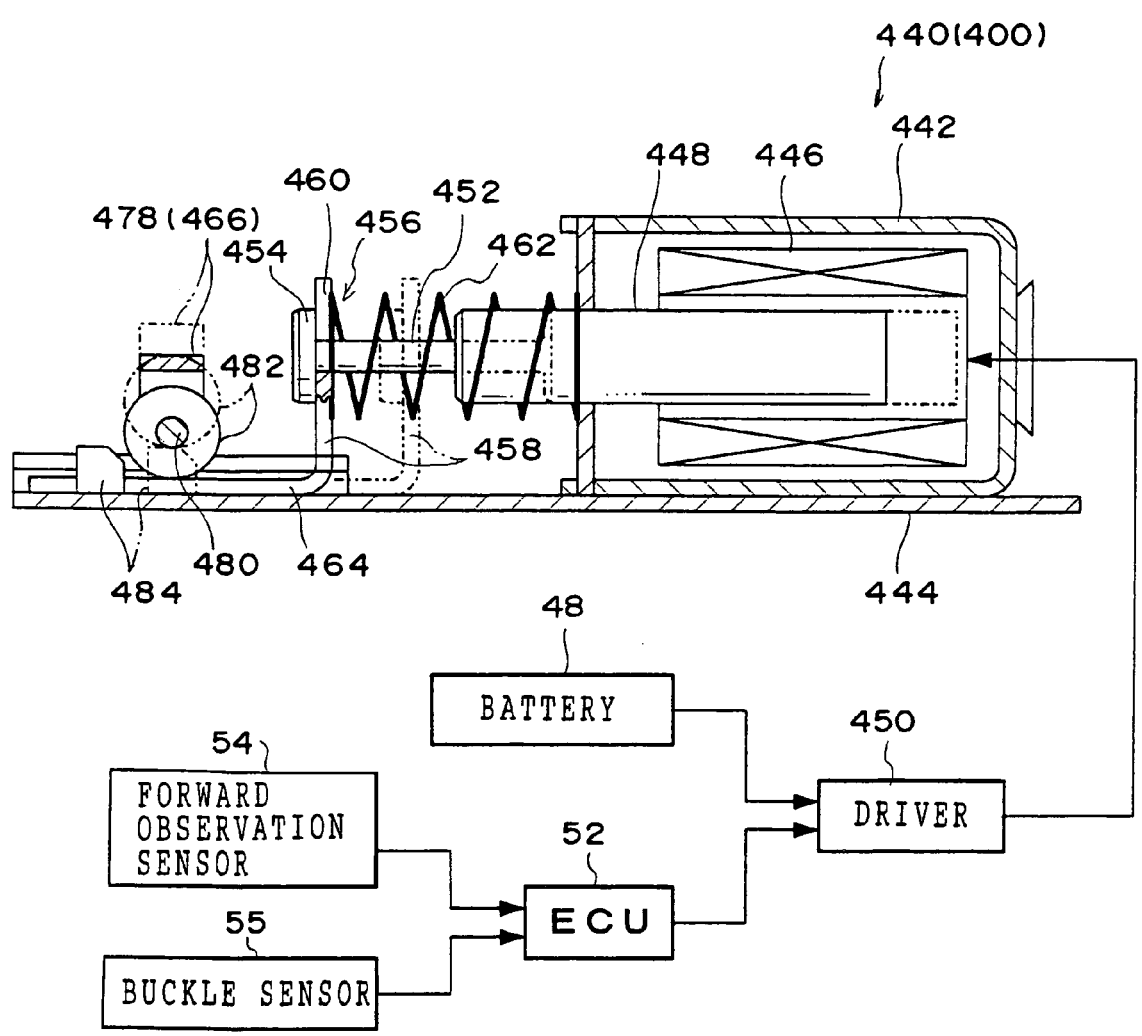
FIG. 6 is a side sectional view of a control solenoid device structuring the torque control mechanism.

The solenoid housing 442 is fixed on a base plate 444 which is disposed between the leg plate 16 and the leg plate 18 and which is integrally mounted to the leg plate 18. As shown in FIG. 6, a solenoid 446 is disposed in the solenoid housing 442. The proximal end side of a plunger 448, which is formed of a magnetic metal such as iron or the like, is accommodated at the inner side of the solenoid 446. When a magnetic field is formed around the solenoid 446 due to the solenoid 446 being energized, the solenoid 446 attracts the plunger 448 due to the magnetic force at this time, and pulls the plunger 448 into the interior of the solenoid housing 442.

Further, the solenoid 446 is electrically connected to the battery 48 and the ECU 52 via a driver 450. When an energization signal outputted from the ECU 52 is inputted to the driver 450, the driver 450 applies current to the solenoid 446. When an energization canceling signal outputted from the ECU 52 is inputted to the driver 450, the driver 450 stops the energization of the solenoid 446.

On the other hand, as shown in FIG. 6, the distal end side of the plunger 448 projects at the exterior of the solenoid housing 442. A rod 452, which is more slender than the plunger 448, is provided coaxially and integrally with the distal end of the plunger 448. Moreover, a stopper 454, which is shaped as a disc whose outer diameter is larger than that of the main body portion of the plunger 448, is provided coaxially and integrally with the distal end portion of the rod 452.

Figure 7:
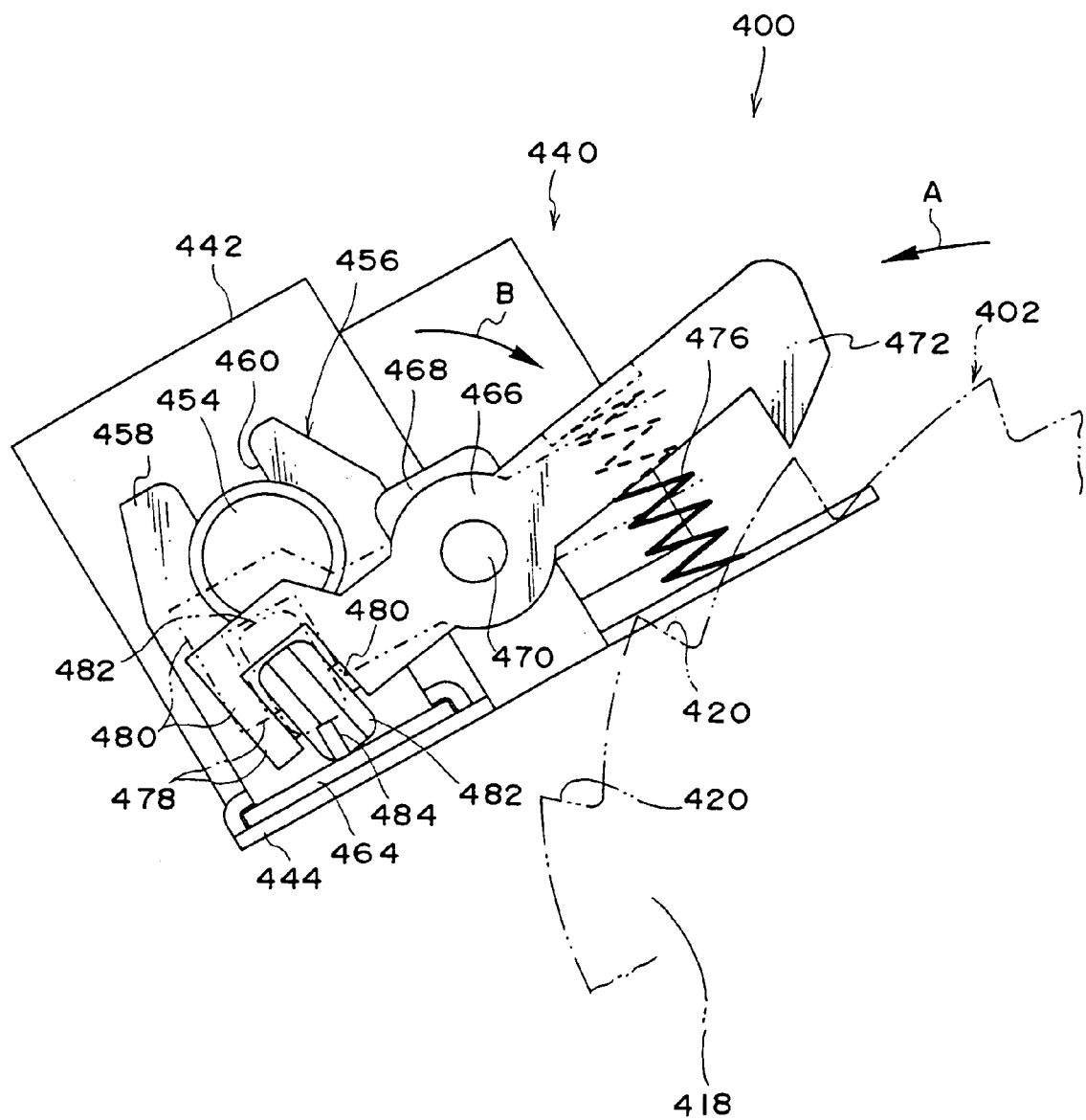
FIG. 7 is a front view of the control solenoid device structuring the torque control mechanism.

A vertical wall portion 458 of a slider 456 is disposed between the stopper 454 and the distal end portion of the plunger 448. As shown in FIGS. 6 and 7, a cut-out portion 460, whose top end is open, is formed in the vertical wall portion 458. The opening width of the cut-out portion 460 is extremely slightly larger than the outer diameter of the rod 452. The rod 452 passes through the cut-out portion 460 in a state in which the rod 452 abuts the bottom portion of the cut-out portion 460. Further, as shown in FIG. 6, a return spring 462 is disposed between the vertical wall portion 458 and the solenoid housing 442.

The return spring 462 is a coil-shaped compression coil spring. The plunger 448 and the rod 452 pass through the return spring 462. One end of the return spring 462 abuts the solenoid housing 442, whereas the other end of the return spring 462 abuts the vertical wall portion 458. Due to the urging force of the return spring 462, the vertical wall portion 458 is urged along the axial direction of the plunger 448 in a direction of moving away from the solenoid housing 442, and is pressed against the stopper 454.

Accordingly, the vertical wall portion 458 is basically nipped by the stopper 454 and the return spring 462. The plunger 448 is urged, via the vertical wall portion 458, the stopper 454, and the rod 452, in a direction of projecting from the solenoid housing 442. However, the urging force of the return spring 462 is smaller than the attraction at the time when the magnetic force, which is generated when the solenoid 446 is energized, attracts the plunger 448. Thus, when the solenoid 446 is energized, the attraction based on the magnetic force pulls the plunger 448 into the solenoid-housing 442 against the urging force of the return spring 462.

On the other hand, as shown in FIG. 6, a slider main body 464, which is shaped as a flat plate, extends from the bottom end of the vertical wall portion 458 toward the side opposite the solenoid housing 442. As shown in FIG. 7, a pawl 466 is provided above the slider main body 464. A supporting wall 468 stands erect at the base plate 444 at the rear side (the solenoid housing 442 side) of the pawl 466. A supporting shaft 470, whose axial direction is the same direction as the rotation axis direction of the above-described control gear 402, passes through the pawl 466 and the supporting wall 468. The pawl 466 is pivotally supported by the supporting shaft 470 so as to be freely rotatable around the supporting shaft 470.

Moreover, as shown in FIG. 7, an engaging claw 472 is formed at the pawl 466. The distal end side of the engaging claw 472 is bent toward the ratchet teeth 420 of the ratchet plate 418. The engaging claw 472 is usually positioned at the outer side of the outer peripheral portion of the ratchet plate 418 (i.e., at the outer side of the distal ends of the ratchet teeth 420). However, when the pawl 466 is rotated a predetermined angle in the direction of arrow B in FIG. 7, the engaging claw 472 moves toward the rotation radius direction inner side of the ratchet plate 418, and abuts the ratchet tooth 420. In this way, the engaging claw 472 restricts rotation of the ratchet plate 418 in the direction of arrow B in FIG. 7, i.e., in the take-up direction.

Moreover, an abutment wall 474 extends from the rear surface (the solenoid housing 442 side surface) of the engaging claw 472. A return spring 476 is disposed between the abutment wall 474 and the base plate 444. The return spring 476 is a coil-shaped compression coil spring, and urges the abutment wall 474 in a direction of moving away from the base plate 444 (i.e., upwardly of the base plate 444). Due to the urging force of the return spring 476, the engaging claw 472 of the pawl 466 is usually positioned at the outer side of the outer peripheral portion of the ratchet plate 418.

On the other hand, a roller attachment portion 478 is formed at the side of the pawl 466 that is opposite from the side at which the engaging claw 472 is formed, with respect to the center of rotation of the pawl 466. The roller attachment portion 478 is formed in a substantially concave shape which opens approximately toward the base plate 444 (i.e., downward). A supporting shaft 480 is fixed at the inner side of the roller attachment portion 478. The longitudinal direction of the pawl 466 (i.e., the direction from the roller attachment portion 478 through the center of rotation and toward the engaging claw 472) is the axial direction of the supporting shaft 480. The supporting shaft 480 supports a roller 482, which is provided at the inner side of the roller attachment portion 478, such that the roller 482 is freely rotatable. The outer peripheral surface of the roller 482 contacts the top surface of the slider main body 464. When the slider main body 464 slides along the axial direction of the above-described plunger 448, the roller 482 rotates due to the friction between the roller 482 and the slider main body 464.

As shown in FIGS. 6 and 7, a cam portion 484 is formed at the slider main body 464 by cutting and bending upward a portion of the side portion of the slider main body 464. The cam portion 484 is formed at the side of the roller 482 that is opposite from the side thereof at which the solenoid housing 442 is disposed. However, due to the slider main body 464 sliding toward the solenoid housing 442, the cam portion 484 approaches the roller 482, moves in under the roller 482, and pushes the roller 482 up.

(Structure of Clutch 220)

Figure 8:
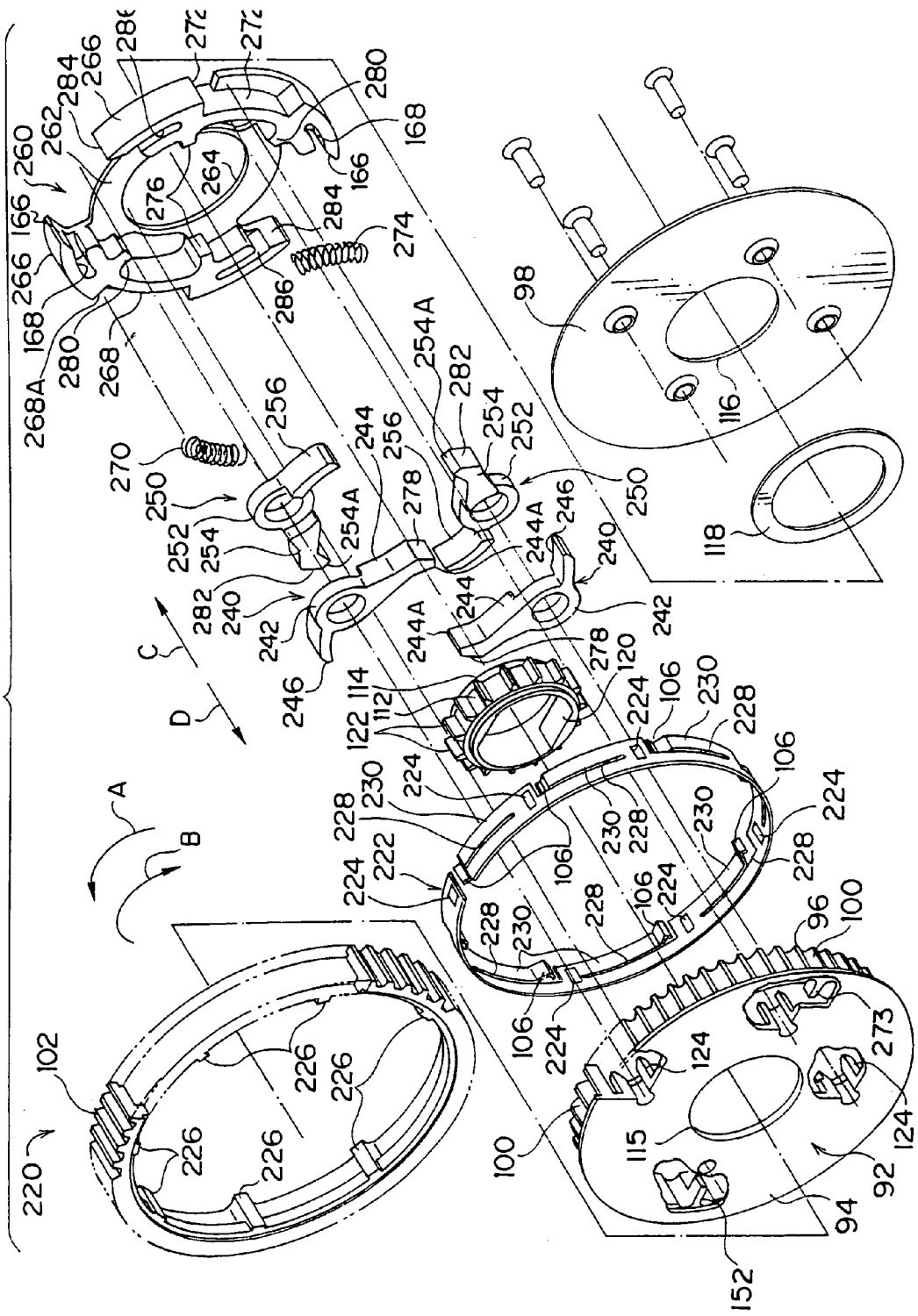
FIG. 8 is an exploded perspective view showing the structure of a clutch applied to the webbing retractor relating to the first embodiment of the present invention.
Figure 9:
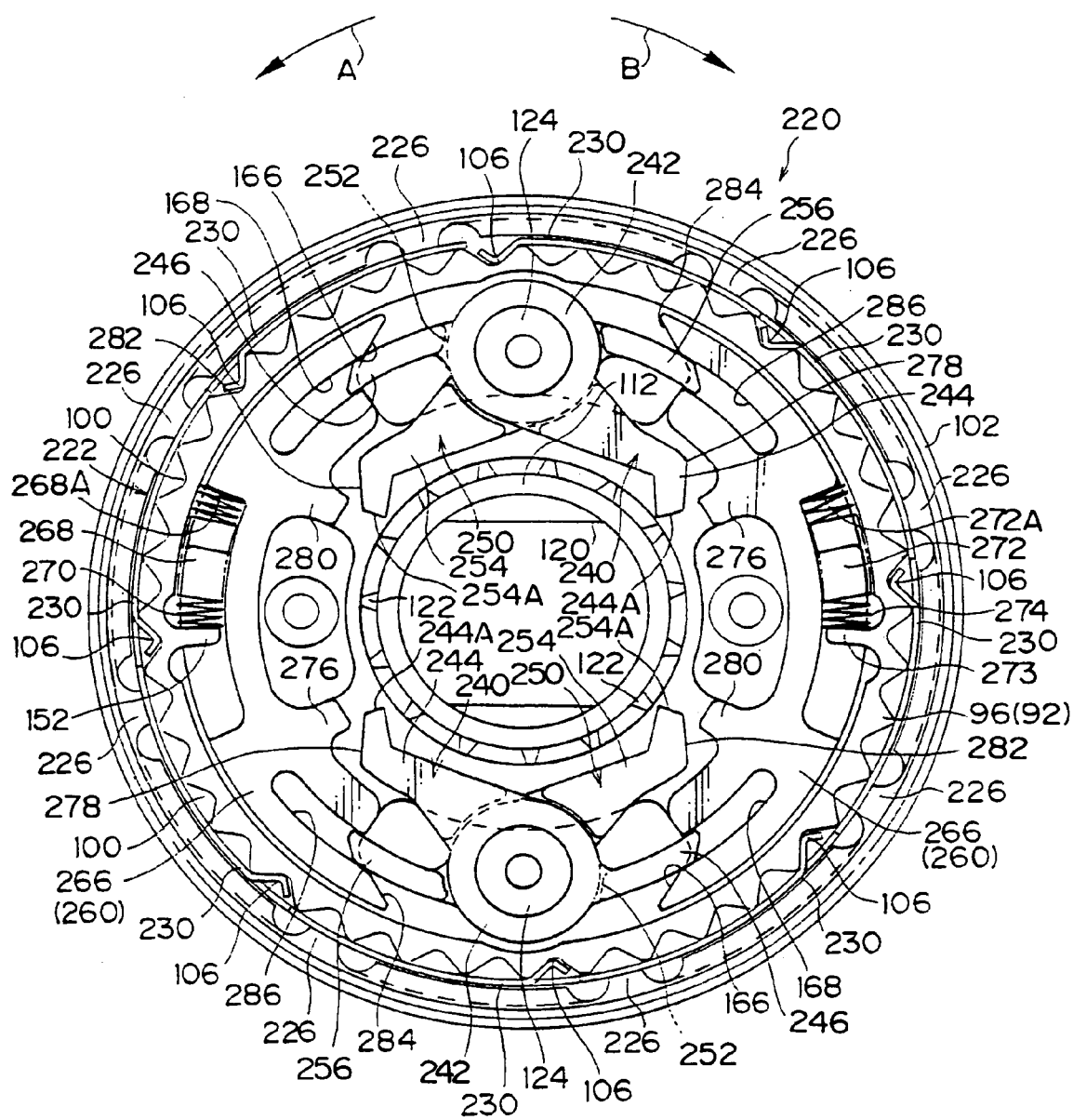
FIG. 9 is a plan view showing the structure of the clutch.

On the other hand, the clutch 220 is provided above the aforementioned gear 434. As shown in FIGS. 8 and 9, the clutch 220 has a base plate 92. The base plate 92 is formed in the shape of a hollow cylinder which has a bottom and whose axial direction dimension is extremely short (or in the shape of a shallow tray). A substantially ring-shaped peripheral wall 96 is formed along the outer peripheral portion of a disc-shaped base portion 94 of the base plate 92. A cover 98, which is shaped as a thin disc, is attached to the open end at one axial direction end side of the base plate 92 (the arrow C direction side in FIG. 8), such that the open end of the base plate 92 is basically closed.

Engaging recesses 100 are formed at uniform intervals along the peripheral direction in the outer peripheral portion of the peripheral wall 96. The external gear 102, which is substantially ring-shaped and which has a number of teeth which is sufficiently larger than that of the gear 434, is provided at the outer side of the peripheral wall 96, coaxially with the base plate 92. As shown in FIGS. 1 and 2, the external gear 102 meshes with the gear 434 of the control gear 402.

As shown in FIGS. 8 and 9, the inner diameter of the external gear 102 is sufficiently larger than the outer diameter of the peripheral wall 96. An annular gap is formed between the inner peripheral portion of the external gear 102 and the outer peripheral portion of the peripheral wall 96. A torque limiter 222 is disposed in this annular gap.

The torque limiter 222 is formed, on the whole, in a substantial ring shape of a metal or the like which has a spring property. The direction of thickness of the torque limiter 222 runs along the radial direction thereof. Engaging holes 224, which pass through the torque limiter 222 in the direction of thickness thereof, are formed in the torque limiter 222 at predetermined intervals (at substantially every 45° around the center of the torque limiter 222 in the present embodiment).

Engaging projections 226, which are formed at uniform intervals at the inner peripheral portion of the external gear 102, enter into the engaging holes 224. When the external gear 102 attempts to rotate with respect to the torque limiter 222, the inner peripheral portions of the engaging holes 224 interfere with the engaging projections 226, and restrict relative rotation of the external gear 102 with respect to the torque limiter 222 (i.e., basically, the torque limiter 222 and the external gear 102 are connected substantially integrally).

A plurality of cut-outs 228 are formed at uniform intervals in the torque limiter 222 along the peripheral direction thereof. At the substantial center in the axial direction of the torque limiter 222 (the substantial center in the widthwise direction) the cut-outs 228 extend over a given distance in the peripheral direction from points which are set at fixed intervals. Then, the cut-outs 228 bend at substantial right angles so as to head toward an axial direction end portion of the torque limiter 222, and are open at that one axial direction end (widthwise direction end).

By forming the above-described cut-outs 228, a plurality of spring pieces 230 are formed around the center of the torque limiter 222. At one end side thereof when the axial direction central portion of the torque limiter 222 is considered to be a border, the proximal end portion of the spring piece 230 is connected to the main body portion of the torque limiter 222, and the distal end side of the spring piece 230 is a free end.

An engaging portion 106, which is bent as if to project out toward the radial direction central side of the torque limiter 222, is formed at the distal end of the spring piece 230. The engaging portions 106 correspond to the plurality of engaging recesses 100 which are formed in the aforementioned peripheral wall 96 (base plate 92). In the state in which the peripheral wall 96 is positioned substantially coaxially at the inner side of the external gear 102, the engaging portions 106 enter into some of the plurality of the engaging recesses 100.

As described above, the engaging projections 226 are in the engaging holes 224. Thus, when the external gear 102 attempts to rotate relative to the base plate 92 around the axial center of the base plate 92, the torque limiter 222 also of course attempts to rotate integrally together with the external gear 102.

However, due to the engaging portions 106 of the spring pieces 230 being in the engaging recesses 100, when the engaging portions 106 attempt to rotate along the peripheral direction of the peripheral wall 96, the engaging recesses 100 interfere with the engaging portions 106 such that rotation of the engaging portions 106 is restricted. In this way, relative rotation of the external gear 102 with respect to the base plate 92 is restricted, and the external gear 102 and the base plate 92 are connected integrally.

However, as described above, because the torque limiter 222 is formed of a metal or the like having a spring property, the spring pieces 230 also of course have a spring property. Accordingly, if the torque generated by the relative rotation of the external gear 102 with respect to the base plate 92 is large enough to pull the engaging portions 106 out from the engaging recesses 100 against the spring forces (urging forces) of the spring pieces 230, the interference of the engaging recesses 100 with the engaging portions 106 is released. Therefore, relative rotation of the external gear 102 with respect to the base plate 92 becomes possible.

On the other hand, an adapter 112, which is substantially hollow cylindrical, is disposed substantially coaxially with the base plate 92 at the inner side of the base plate 92. On the whole, the axial direction other end (the arrow D direction side in FIG. 8) of the adapter 112 is pivotally supported at a circular hole 115 formed in the center of the base portion 94 (the base plate 92). A tubular portion 114, which is hollow cylindrical and is formed coaxially at the other end of the adapter 112, is pivotally supported at a circular hole 116 formed in the cover 98.

A fit-together hole 120, which passes through along the axial direction of the adapter 112, is formed in the adapter 112. The other axial direction end of the spool 20 is fit into the fit-together hole 120, such that the adapter 112 and the spool 20 are connected together coaxially and integrally. Further, a plurality of external teeth 122, which is an odd number of teeth, are formed at uniform intervals at the outer peripheral portion of the adapter 112.

Moreover, a pair of bosses 124 are formed at the base portion 94 of the base plate 92 at the radial direction outer side of the adapter 112. Each boss 124 is formed as a substantially hollow cylinder, and stands erect from the base portion 94 toward one side in the axial direction thereof. These bosses 124 are formed so as to oppose one another across the circular hole 115. A pawl 240 is provided at each boss 124.

The pawl 240 has a main body 242. The main body 242 is formed in the shape of a ring whose inner diameter is extremely slightly larger than the outer diameter of the boss 124. Due to the main body 242 being fit together with the boss 124 such that the boss 124 passes through the main body 242, the pawl 240 is pivotally supported so as to be freely rotatable around the boss 124. A connecting piece 244 is formed at a portion of the outer periphery of the main body 242.

The dimension, along the axial direction of the main body 242, of the connecting piece 244 is sufficiently larger than that of the main body 242. At the surface at the side facing the base portion 94, the connecting piece 244 and the main body 242 are substantially flush. However, at the side opposite the base portion 94, the connecting piece 244 projects out toward the axial direction other side of the base plate 92 more than the main body 242 does. In this way, the dimension of the connecting piece 244 along the axial direction of the main body 242 is longer than that of the main body 242. Thus, the connecting piece 244 is formed in the shape of a tongue piece whose longitudinal direction runs approximately along the direction in which the connecting piece 244 extends, and whose transverse direction runs along the axial direction of the main body 242.

Each of the connecting pieces 244 is formed such that, in the state in which the main body 242 is pivotally supported at the boss 124, the connecting piece 244 extends toward the take-up direction (in FIGS. 8 and 9, the arrow B direction) side of the spool 20 with respect to the main body 242. Moreover, each connecting piece 244 is formed such that, due to the pawl 240 rotating by a predetermined angle in the take-up direction around the boss 124, a corner portion of a distal end 244A abuts the outer peripheral surface of the adapter 112 between the external tooth 122 and the external tooth 122 of the adapter 112.

The distal end 244A of the connecting piece 244 is formed as an inclined surface which is inclined so as to correspond to the pull-out direction (in FIGS. 8 and 9, the arrow A direction) side surfaces of the teeth of the adapter 112. Due to the distal end 244A abutting and interfering with the external tooth 122, rotation of the adapter 112 in the pull-out direction is restricted.

Here, as described above, the bosses 124 are formed so as to oppose one another across the circular hole 115. Therefore, in a state in which the corner portions of the distal ends 244A of the pawls 240 which have basically the same configurations contact the outer peripheral surface of the adapter 112, the distal end 244A of one of the pawls 240 is positioned, across the axial center of the adapter 112, at the opposite side of the distal end 244A of the other of the pawls 240. Accordingly, if the total number of the external teeth 122 formed at the outer peripheral portion of the adapter 112 is an even number and the external tooth 122 is formed at the opposite side, across the axial center of the adapter 112, of any of the external teeth 122, the distal ends 244A of the both pawls 240 both abut the external teeth 122.

However, as mentioned above, in the present embodiment, the total number of the external teeth 122 formed at the outer peripheral portion of the adapter 112 is an odd number. Thus, in the state in which the distal end 244A of the one pawl 240 is abutting the external tooth 122, the distal end 244A of the other pawl 240 has moved apart from the external tooth 122 along the peripheral direction of the adapter 112 (i.e., the distal end 244A of the other connecting piece 244 is not contacting the external tooth 122).

On the other hand, a releasing piece 246 extends from the outer peripheral portion of the main body 242. The releasing piece 246 is formed at the side of the main body 242 approximately opposite the side at which the connecting piece 244 is formed. Toward the distal end side thereof, the releasing piece 246 gradually curves toward the axial center of the base plate 92. By rotating the releasing piece 246 in the pull-out direction, the connecting piece 244 rotates in the direction of moving away from the outer peripheral portion of the adapter 112. In the same way as the connecting piece 244, the dimension of the releasing piece 246, along the axial direction of the main body 242, is greater than that of the main body 242. At the base portion 94 side, the main body 242 and the releasing piece 246 are flush. The releasing piece 246 projects further than the main body 242 toward the side opposite the base portion 94.

A main body 252 of a pawl 250 is pivotally supported so as to be freely rotatable around the boss 124, further toward the distal end side of the boss 124 than the main body 242 of the pawl 240. The pawls 250 basically have the same structure as the pawls 240. The pawl 250 is formed such that a connecting piece 254 and a releasing piece 256, whose dimensions along the axial direction of the main body 252 are greater than that of the main body 252, extend from the outer peripheral portion of the main body 252. However, in contrast with the pawl 240, at the pawl 250, in the state in which the main body 252 is supported at the boss 124, the connecting piece 254 is formed to be further toward the pull-out direction side than the main body 252, and the releasing piece 256 is formed to be further toward the take-up direction side than the main body 252.

In contrast with the pawl 240, at the pawl 250, the main body 252 and the connecting piece 254 and the releasing piece 256 are flush at the side opposite the base portion 94, whereas the connecting piece 254 and the releasing piece 256 project further than the main body 252 at the base portion 94 side. Accordingly, due to the pawl 250 rotating by a predetermined angle in the pull-out direction around the boss 124, the corner portion of a distal end 254A of the connecting piece 254 abuts the outer peripheral portion of the adapter 112 between the external tooth 122 and the external tooth 122. Due to the distal end 254A contacting the take-up direction side surface of the external tooth 122, rotation of the adapter 112 in the take-up direction is restricted.

Further, the clutch 220 is equipped with an inertial plate 260. The inertial plate 260 has a substantially plate-shaped base portion 262 whose direction of thickness runs along the axial directions of the base plate 92 and the adapter 112. A circular hole 264 is formed in the base portion 262. The inner diameter of the circular hole 264 is extremely slightly larger than the outer diameter of the tubular portion 114 formed coaxially with respect to the outer peripheral portion of the adapter 112 at the axial direction other end side of the adapter 112. By carrying out assembly by making the tubular portion 114 pass through the circular hole 264, the base portion 262, and thus, the inertial plate 260 are pivotally supported at the adapter 112 so as to freely rotate around the adapter 112.

Further, a pair of blocks 266 are formed at the base portion 94 side surface of the base portion 262. The blocks 266 are formed so as to oppose one another across the circular hole 264. One of the bosses 124 is positioned at one of the outer peripheral regions of the outer side of the circular hole 264, between the pair of blocks 266. The other boss 124 is positioned at the other outer peripheral region, which is at the side of the circular hole 264 opposite this position.

A spring accommodating portion 268 is formed at the outer peripheral portion of one of the pair of blocks 266 (the outer side surface of the block 266 which outer side surface runs along the radial direction of the circular hole 264). A compression coil spring 270 is accommodated in the spring accommodating portion 268.

The compression coil spring 270 is accommodated in the spring accommodating portion 268 in a state in which the compression coil spring 270 curves around the center of the circular hole 264. The take-up direction side end portion of the compression coil spring 270 abuts a wall portion 268A of the spring accommodating portion 268. The pull-out direction side end portion of the compression coil spring 270 abuts an abutment wall 152 which extends from the inner peripheral portion of the peripheral wall 96 of the base plate 92 and which enters into the spring accommodating portion 268.

The inertial plate 260 is pivotally supported at the tubular portion 114 of the adapter 112. Therefore, basically, the inertial plate 260 freely rotates relative not only to the adapter 112 but to the base plate 92 as well. However, as described above, the take-up direction side end portion of the compression coil spring 270 abuts the wall portion 268A of the spring accommodating portion 268, and the pull-out direction side end portion of the compression coil spring 270 abuts the abutment wall 152 of the base plate 92. Therefore, when the base plate 92 attempts to rotate in the take-up direction relative to the inertial plate 260, the abutment wall 152 pushes the inertial plate 260 in the take-up direction via the compression coil spring 270, and makes the inertial plate 260 rotate following the rotation of the base plate 92.

Therefore, provided that torque, which is of a magnitude which can resist the urging force of the compression coil spring 270, is not applied to the inertial plate 260, rotation of the base plate 92 in the take-up direction relative to the inertial plate 260 is limited.

A spring accommodating portion 272 is formed at the outer peripheral portion of the other of the pair of blocks 266 (the outer side surface of the block 266 which outer side surface runs along the radial direction of the circular hole 264). A compression coil spring 274 is accommodated in the spring accommodating portion 272. The spring accommodating portion 272, the compression coil spring 274, and an abutment wall 272A are provided so as to be symmetrical, across the center of the circular hole 264, to the spring accommodating portion 268, the compression coil spring 270, and the abutment wall 152.

Accordingly, when the base plate 92 rotates in the pull-out direction around the adapter 112, the compression coil spring 274 rotates the inertial plate 260 in the pull-out direction by the urging force, such that the inertial plate 260 follows the base plate 92.

In this way, the urging forces of the compression coil spring 270 and the compression coil spring 274 with respect to the inertial plate 260 act in opposite directions around the center of the base plate 92 and the inertial plate 260. Therefore, usually, the rotational position of the inertial plate 260 with respect to the base plate 92 is maintained at a position at which the urging force of the compression coil spring 270 and the urging force of the compression coil spring 274 are in balance.

Further, as shown in FIGS. 8 and 9, a pressing portion 276 is formed at the inner peripheral portion of each block 266. These pressing portions 276 are formed at the take-up direction sides of the pawls 240. Inclined surfaces 278 are formed at the transverse direction outer ends of the connecting pieces 244 of the pawls 240, in correspondence with the pushing portions 276. The inclined surface 278 is inclined outwardly in the radial direction of the base plate 92 with respect to the take-up direction. In the state in which the distal end 244A does not contact the outer peripheral portion of the adapter 112, the inclined surface 278 opposes the pushing portion 276 along the peripheral direction of the base plate 92 and the inertial plate 260.

The pushing portion 276 is formed so as to abut the inclined surface 278 due to the base plate 92 rotating by a predetermined amount in the take-up direction relative to the inertial plate 260. When, from this state of abutment, the base plate 92 attempts to rotate even further in the take-up direction relative to the inertial plate 260, the inclined surface 278 is pushed in the pull-out direction by the pushing portion 276. Due to this pushing force, the pawl 240 rotates in the take-up direction around the boss 124.

A pushing portion 280 is formed at the inner peripheral portion of each block 266. The pushing portion 280 is formed at the side of the central portion of the block 266, which runs along the peripheral direction of the inertial plate 260, which side is opposite from the side at which the pushing portion 276 is formed. The pushing portions 280 are formed at the pull-out direction sides of the pawls 250. Inclined surfaces 282 are formed at the transverse direction outer ends of the connecting pieces 254 of the pawls 250, in correspondence with the pushing portions 280.

The inclined surface 282 is inclined toward the outer side in the radial direction of the base plate 92, with respect to the pull-out direction. In the state in which the distal end 254A is not contacting the outer peripheral portion of the adapter 112, the inclined surface 282 opposes the pushing portion 280 along the peripheral direction of the base plate 92 and the inertial plate 260. The pushing portion 280 is formed so as to abut the inclined surface 282 due to the base plate 92 rotating by a predetermined amount in the pull-out direction relative to the inertial plate 260. When, from this state of abutment, the base plate 92 attempts to rotate even further in the pull-out direction relative to the inertial plate 260, the inclined surface 282 is pushed in the take-up direction by the pushing portion 280. Due to this pushing force, the pawl 250 rotates in the pull-out direction around the boss 124.

At the take-up direction side end portion of each block 266 which runs along the peripheral direction of the inertial plate 260, a pushing portion 166 is formed, and a releasing piece accommodating portion 168 is formed further toward the axial center of the inertial plate 260 than the pushing portion 166. The pushing portion 166 is formed so as to correspond to the releasing piece 246 of the pawl 240 along the peripheral direction of the inertial plate 260.

The releasing piece 246 gradually curves toward the axial center of the base plate 92 from the portion thereof connected to the main body 242 (the proximal end portion thereof) toward the distal end side thereof. The transverse direction outer side surface of the releasing piece 246 as well is curved in a similar way. Accordingly, when the base plate 92 rotates by a predetermined amount in the pull-out direction relative to the inertial plate 260, the pushing portions 166 abut the transverse direction outer side surfaces of the releasing pieces 246. In this state of abutment, when the base plate 92 rotates further in the pull-out direction relative to the inertial plate 260, the pushing portions 166 push the distal end portions of the releasing pieces 246 in the take-up direction.

Here, the distal ends of the releasing pieces 246 are inclined surfaces which are inclined toward the outer side in the radial direction of the inertial plate 260, with respect to the pull-out direction. Thus, due to the pushing portions 166 pushing the distal ends of the releasing pieces 246, the pushing portions 166 rotate the pawls 240 in the pull-out direction around the bosses 124 and guide the pawls 240 to the releasing piece accommodating portions 168.

In contrast, at the pull-out direction side end portion of each block 266 which runs along the peripheral direction of the inertial plate 260, a pushing portion 284 is formed, and a releasing piece accommodating portion 286 is formed further toward the axial center of the inertial plate 260 than the pushing portion 284. The pushing portion 284 and the releasing piece accommodating portion 286 are formed so as to be symmetrical to the pushing portion 166 and the releasing piece accommodating portion 168, with respect to the peripheral direction center of the block 266. Due to the pushing portion 284 abutting the transverse direction outer side surface of the releasing piece 256 and pushing the releasing piece 256 in the pull-out direction, the pushing portion 284 rotates the pawl 250 in the take-up direction around the boss 124 and guides the pawl 250 into the releasing piece accommodating portion 286.

A spacer 118, which is formed in a ring shape and of a synthetic resin material, is disposed between the base portion 262 of the inertial plate 260 and the base portion 94 of the base plate 92. The spacer 118 is pivotally supported by the tubular portion 114 of the adapter 112. One axial direction end surface of the spacer 118 abuts the base portion 262 of the inertial plate 260, whereas the other axial direction end surface abuts the end surface of the connecting portion where the main body portion of the adapter 112 is connected to the tubular portion 114.

Operation and Effects of First Embodiment

Next, the operation and effects of the present embodiment will be described by way of explaining the operation of the present webbing retractor 10.

(Basic Operation of Webbing Retractor 10)

First, the basic operation of the present webbing retractor 10 will be described.

In the present webbing retractor 10, in the state in which the webbing belt 28 is taken-up and accommodated in the form of a roll on the spool 20, when the webbing belt 28 is pulled while an unillustrated tongue plate is pulled, the webbing belt 28 is pulled out while the spool 20 is rotated in the pull-out direction against the urging force of the spiral spring 34 which urges the spool 20 in the take-up direction.

In this way, in the state in which the webbing belt 28 is pulled out, the vehicle occupant seated in a seat inserts the tongue plate in an unillustrated buckle device while pulling the webbing belt 28 around the front of his/her body, such that the tongue plate is held in the buckle device. The webbing belt 28 is thereby set in a state of being applied to the body of the vehicle occupant (hereinafter, this state will be referred to simply as the "applied state").

When the webbing belt 28 is pulled out and the spool 20 is rotated in the pull-out direction in order to apply the webbing belt 28 to the body of a vehicle occupant, the spiral spring 34 is wound tighter, such that the urging force of the spiral spring 34 which urges the spool 20 in the take-up direction increases. Accordingly, in the aforementioned applied state, the urging force of the spiral spring 34 rotates the spool 20 in the take-up direction and makes the webbing belt 28 be taken-up on the spool 20.

(Operation and Effects at the Time of Normal Application of Webbing Belt 28)

When the buckle sensor 55 senses that the tongue plate has been inserted in the buckle device, a control signal is outputted from the ECU 52 to the driver 46. In this way, the driver 46 applies current to the motor 44, and drives the motor 44 to rotate forward. When the output shaft 50 rotates forward due to the forward rotational driving force of the motor 44, the rotation of the output shaft 50 is transmitted to the drive gear 404 of the control gear 402 via the gear 56, and the drive gear 404 is rotated in a decelerated manner.

Due to the drive gear 404 rotating, the internal teeth of the inner tube portion 408 rotate integrally. Thus, the torque of the drive gear 404 is transmitted to the planetary gears 410 which mesh with the internal teeth of the inner tube portion 408. In this way, the planetary gears 410 rotate the sun gear 422 in the direction of arrow A in FIG. 4, while the planetary gears 410 autorotate around the carrier shafts 414.

In this state, the engaging claw 472 of the pawl 466 is not meshing with the ratchet teeth 420 of the ratchet plate 418. The ratchet plate 418 rotates freely, and the sun gear 422 also rotates freely. Accordingly, the sun gear 422, which receives the torque from the planetary gears 410, rotates around the center shaft 416. The planetary gears 410, at which rotational moments are generated due to the autorotation of the planetary gears 410 around the carrier shafts 414 and the reaction force from the sun gear 422, also revolve slightly in the direction of arrow A in FIG. 4 around the sun gear 422. This slight rotation of the planetary gears 410 rotates the carrier plate 412 slightly via the carrier shafts 414.

However, the rotation of the carrier plate 412 does not reach rotation of the drive gear 404, and the drive gear 404 rotates the same as or more than the carrier plate 412. In this way, when the drive gear 404 rotates the same as or more than the carrier plate 412, the inner peripheral portion of one of the pair of holes 430 rotates, in the direction of rotation of the drive gear 404, the peripheral direction end portion of the clutch spring 428 which is inserted in that hole 430. The both peripheral direction ends of the clutch spring 428 are fit with play in the holes 430. Therefore, even if one of the peripheral direction end portions of the clutch spring 428 is pushed by the inner peripheral portion of the one hole 430, the other peripheral direction end portion of the clutch spring 428 is not immediately pressed by the inner peripheral portion of the other hole 430.

When the clutch spring 428 rotates due to one of the peripheral direction end portions of the clutch spring 428 being pressed by the inner peripheral portion of one of the holes 430 as described above, the friction between the inner peripheral portion of the clutch spring 428 and the outer peripheral portion of the tube portion 426 works to impede this rotation. When the frictional force works in this way, a delay arises in the rotation at the other peripheral direction end side of the clutch spring 428, with respect to the one peripheral direction end portion of the clutch spring 428 which is pushed by the inner peripheral portion of the one hole 430 and is attempting to rotate.

Due to this delay in rotation of the other peripheral direction end side with respect to the one peripheral direction end side, the clutch spring 428 tightens around the tube portion 426. In this way, the frictional force between the clutch spring 428 and the tube portion 426 further increases. The clutch spring 428 thereby attempts to rotate following the tube portion 426, and the clutch spring 428 and the tube portion 246, i.e., the carrier plate 412, are substantially frictionally connected.

The carrier plate 412, which is frictionally connected to the clutch spring 428 in this way, rotates together with the drive gear 404, and rotates the gear 424. Moreover, the carrier plate 412 rotates the external gear 102, which meshes with the gear 424, in the take-up direction at a rotational speed which is greater than or equal to a predetermined value. Because the external gear 102 is mechanically connected to the base plate 92 via the torque limiter 222, due to the external gear 102 rotating in the take-up direction, the base plate 92 rotates integrally in the take-up direction.

When the base plate 92 rotates in the take-up direction, the abutment wall 152 pushes the pull-out direction side end portion of the compression coil spring 270, and the compression coil spring 270 pushes the wall portion 268A of the spring accommodating portion 268 by urging force. The inertial plate 260 thereby rotates so as to follow the base plate 92.

However, the inertial plate 260 basically attempts to stay at that place due to inertia based on the self-weight thereof. Thus, when the base plate 92 suddenly rotates at a speed that is equal to or greater than a predetermined value due to the driving force of the motor 44, before the urging force of the compression coil spring 270 makes the inertial plate 260 rotate in a following manner (i.e., against the urging force of the compression coil spring 270), the base plate 92 rotates in the take-up direction relative to the inertial plate 260.

In this way, when the base plate 92 rotates by a predetermined amount or more in the take-up direction relative to the inertial plate 260, the pushing portions 276 formed at the blocks 266 of the inertial plate 260 abut the connecting pieces 244 of the pawls 240. In this state, when the base plate 92 attempts to rotate further in the take-up direction relative to the inertial plate 260, the pushing portions 276 push the inclined surfaces 278 of the connecting pieces 244 in the pull-out direction.

Figure 10:
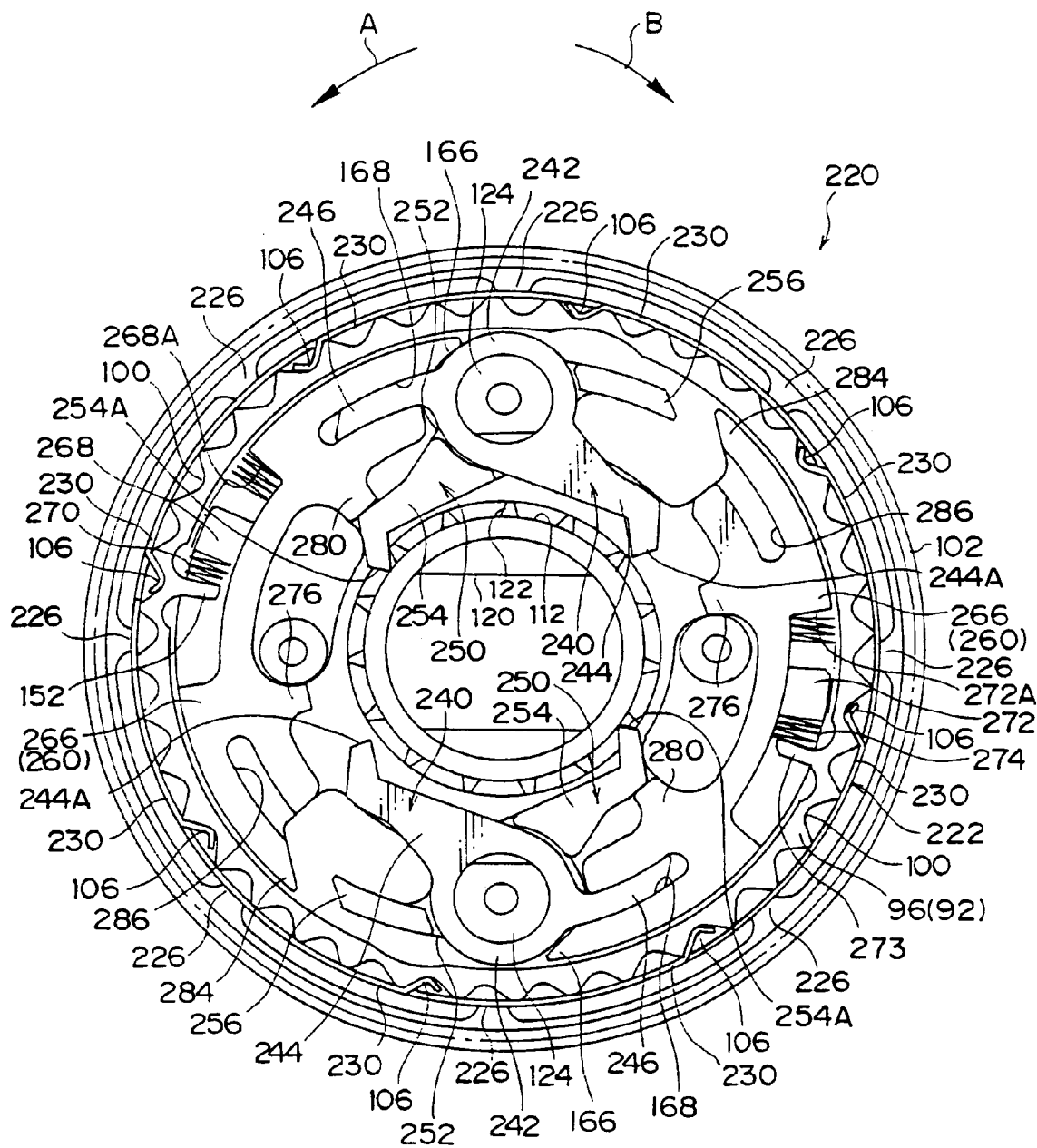
FIG. 10 is a plan view showing a state in which take-up direction rotation of the clutch of FIG. 9 is being transmitted.

The pushing forces applied to the inclined surfaces 278 act in the pull-out direction and toward the inner side in the radial direction of the inertial plate 260 and the base plate 92. The portions of the forces, which portions act toward the radial direction inner side, rotate the pawls 240 in the take-up direction around the bosses 124. Due to the pawls 240 rotating in the take-up direction around the bosses 124, as shown in FIG. 10, the corner portions of the distal ends 244A abut the outer peripheral portion of the adapter 112. In this state, the pawls 240 rotate together with the base plate 92 in the take-up direction around the center of the base plate 92, until the paw is 240 abut the external teeth 122 which are adjacent at the take-up direction sides.

Then, in this state, when the distal ends 244A abut the external teeth 122 and the base plate 92 rotates further in the take-up direction, the distal ends 244A of the pawls 240 push the external teeth 122 in the take-up direction, and rotate the adapter 112, and accordingly, the spool 20, in the take-up direction. Due to this rotation of the spool 20, the webbing belt 28 is taken-up onto the spool 20. In this way, excessive looseness in the webbing belt 28 is eliminated, and the body of the vehicle occupant is restrained by a restraining force of an extent that the vehicle occupant does not experience an uncomfortable sensation or an pressing sensation.

Further, in this way, when the motor 44 stops in the state in which slack has been eliminated, rotation of the base plate 92 in the take-up direction stops. When rotation of the base plate 92 stops, the compression coil spring 270 pushes the inertial plate 260 in the take-up direction by urging force, and rotates the inertial plate 260 in the take-up direction to a position at which the urging force of the compression coil spring 270 and the urging force of the compression coil spring 274 are in balance.

When the inertial plate 260 rotates, the pushing portions 166 abut the releasing pieces 246 of the pawls 240 and push the releasing pieces 246 in the take-up direction. Due to the releasing pieces 246 receiving this pushing force, the pawls 240 rotate in the pull-out direction around the bosses 124, and as shown in FIG. 9, the distal ends 244A of the connecting pieces 244 move away from the outer peripheral portion of the adapter 112. In this way, the mechanical connection between the base plate 92 and the adapter 112, i.e., the mechanical connection between the output shaft 50 of the motor 44 and the compression coil spring 270, is released.

Here, in the present embodiment, as described above, the total number of the external teeth 122 of the adapter 112 is an odd number. In the state in which the distal end 244A of one of the pawls 240 is abutting the external tooth 122, the distal end 244A of the other pawl 240 is apart from the external tooth 122 along the peripheral direction of the adapter 112, and is positioned at an intermediate portion between the external tooth 122, which is adjacent in the take-up direction along the peripheral direction of the adapter 112, and the external tooth 122 which is adjacent in the pull-out direction. Namely, in the present embodiment, in the state in which the distal ends 244A of the both pawls 240 abut the outer peripheral portion of the adapter 112, the interval from the distal end 244A of one of the pawls 240 to the distal end 244A of the other of the pawls 240 is not an integer multiple of the pitch of the external teeth 122.

Thus, even if the distal end 244A of one of the pawls 240 abuts the top land of the external tooth 122 at the time when the both pawls 240 are rotating around the bosses 124, the distal end of the other of the pawls 240 does not abut the top land of the external tooth 122, and abuts the outer peripheral portion of the adapter 112 between the external teeth 122 which are adjacent in the peripheral direction.

Accordingly, even if it is not possible for the distal end 244A of one of the pawls 240 to abut and mesh with the top land of the external tooth 122, the distal end 244A of the other of the pawls 240 reliably meshes with the external tooth 122 if the base plate 92 rotates by substantially one-half of the pitch of the external teeth 122. Thus, the rotation of the base plate 92 can reliably and quickly be transmitted to the adapter 112, and the torque of the motor 44 can be transmitted to the spool 20.

Further, in the present embodiment, as described above, the torque of the drive gear 404 caused by the forward rotational driving force of the motor 44 is transmitted to the tube portion 426 of the carrier plate 412 via the clutch spring 428, and the carrier plate 412 rotates. Accordingly, until the clutch spring 428 tightens around and becomes integral with the tube portion 426, a slight delay or loss in the transmission of rotation between the clutch spring 428 and the tube portion 426 arises. Due to a slight delay or loss in the transmission of rotation arising in this way, the carrier plate 412 can be made to start rotating relatively gently, and the transmission of rotation to the spool 20 via the clutch 220 also can be carried out relatively gently.

In this way, as compared with a case in which sudden transmission of rotation is carried out, when the motor 44 drives, the impact which is imparted to the respective members structuring the control gear 402 (such as the planetary gears 410, the carrier plate 412, and the like) and the respective members structuring the clutch 220 (such as the external gear 102, the pawls 240, and the like) can be made to be small. In this way, the life spans of the respective members forming the control gear 402 and the clutch 220 can be lengthened, and the control gear 402 and the clutch 220 can be made to operate well over a long period of time.

On the other hand, as described above, by rotating the spool 20 in the take-up direction by the torque of the motor 44, the force by which the webbing belt 28 restrains the body of the vehicle occupant is improved. However, in the state in which the webbing belt 28 is wound on the spool 20, until the slack is eliminated the body of the vehicle occupant is an obstacle, and the webbing belt 28 basically cannot be taken up any further on the spool 20. In this state, if the spool 20 attempts to rotate further in the take-up direction and take up the webbing belt 28, the webbing belt 28 is tightened against the body of the vehicle occupant by a force which is greater than needed, which is not preferable.

Here, as described above, if the spool 20 attempts to take-up the webbing belt 28 any more than needed, the body of the vehicle occupant is an obstacle to the taking-up of the webbing belt 28. Tensile force of a magnitude corresponding to the take-up force for the spool 20 to take the webbing belt 28 up is applied to the webbing belt 28 from the body of the vehicle occupant. This tensile force acts opposite to the direction in which the spool 20 takes up the webbing belt 28. Thus, the spool 20 is stopped due to this tensile force being applied to the webbing belt 28.

Here, as described above, in the state in which the engaging claw 472 is not meshing with the ratchet teeth 420 and the ratchet plate 418 and the sun gear 422 rotate freely, due to the carrier plate 412 being frictionally connected to the clutch spring 428, the forward rotational driving force of the motor 44 is transmitted to the carrier plate 412, and is transmitted to the spool 20 via the clutch 220. Accordingly, as described above, in the state in which the spool 20 cannot rotate in the take-up direction, the carrier plate 412, which is connected to the spool 20 via the clutch 220, cannot rotate either.

In this state, when the clutch spring 428 attempts to rotate the carrier plate 412 by friction, the torque applied to the clutch spring 428 wins out over the frictional force between the clutch spring 428 and the tube portion 426, and sliding of the clutch spring 428 with respect to the tube portion 426 arises. In this way, in the state in which sliding of the clutch spring 428 with respect to the tube portion 426 arises, rotation cannot be transmitted from the clutch spring 428 to the tube portion 426, i.e., to the carrier plate 412. Namely, in this state, the transmission of torque in the take-up direction to the spool 20 is basically cut-off, and thus, an increase in the force by which the webbing belt 28 restrains the body of the vehicle occupant can be suppressed.

(Operation of Webbing Retractor 10 when Approaching an Obstacle Ahead)

On the other hand, while the vehicle is traveling, the forward observation sensor 54 detects the distance to an obstacle which is in front of the vehicle (including another vehicle which is traveling or has stopped in front of the vehicle). An electric signal having a signal level corresponding to the distance to the obstacle is outputted from the forward observation sensor 54. The electric signal outputted from the forward observation sensor 54 is inputted to the ECU 52. At the ECU 52, on the basis of the electric signal from the forward observation sensor 54, it is judged whether or not the distance to the obstacle is less than a predetermined value. Next, if it is judged at the ECU 52 that the distance to the obstacle is less than the predetermined value, the ECU 52 outputs a control signal to the driver 46, and applies current to the motor 44 via the driver 46.

In this way, the motor 44 is driven to rotate forward at a speed that is equal to or greater than a predetermined value, and rotates the output shaft 50 forward. The rotation of the output shaft 50 is transmitted to the drive gear 404 of the control gear 402 via the gear 56, and the drive gear 404 is rotated in a decelerated manner. Further, due to the drive gear 404 rotating, because the internal teeth of the inner tube portion 408 rotate integrally therewith, the torque of the drive gear 404 is transmitted to the planetary gears 410 which are meshing with the internal teeth of the inner tube portion 408.

In this way, the planetary gears 410 attempt to transmit rotation to the sun gear 422 while autorotating around the carrier shafts 414.

On the other hand, in this state, an energization signal is outputted from the ECU 52 to the driver 450, and current is thereby made to flow to the solenoid 446 via the driver 450. Due to current flowing to the solenoid 446, a magnetic field is formed around the solenoid 446, and the plunger 448 is attracted by the magnetic force at this time. Due to this attraction, the proximal end side of the plunger 448 is pulled into the interior of the solenoid housing 442 against the urging force of the return spring 462.

Due to the proximal end side of the plunger 448 being pulled into the interior of the solenoid housing 442, the rod 452 formed at the distal end of the plunger 448 moves toward the solenoid housing 442, and the slider 456, which is anchored to the rod 452, moves toward the solenoid housing 442. When the slider 456 moves toward the solenoid housing 442 and the cam portion 484 moves to beneath the roller 482, the roller 482 rides up on the cam portion 484, and the pawl 466 is rotated in the direction of arrow B in FIG. 7 against the urging force of the return spring 476.

The engaging claw 472 formed at the pawl 466 thereby approaches the outer peripheral portion of the ratchet plate 418. In this way, the engaging claw 472, which approaches the outer peripheral portion of the ratchet plate 418, meshes with the ratchet tooth 420 formed at the outer peripheral portion of the ratchet plate 418, so as to restrict rotation of the ratchet plate 418 in the direction of arrow B in FIGS. 2 and 7, i.e., in the take-up direction.

In this state, as described above, the planetary gears 410, which receive the forward rotational driving force of the motor 44, attempt to transmit torque to the sun gear 422 while revolving in the direction of arrow B in FIG. 4 around the sun gear 422 while autorotating around the carrier shafts 414. However, in this state, because rotation of the ratchet plate 418 is restricted by the engaging claw 472 of the pawl 466, rotation of the sun gear 422 as well is of course restricted.

Accordingly, in this state, even if the rotation of the planetary gears 410 is transmitted to the sun gear 422, the sun gear 422 cannot rotate. Instead, the planetary gears 410 revolve around the sun gear 422 while autorotating around the carrier shafts 414. In this way, due to the planetary gears 410 revolving around the sun gear 422, the carrier shafts 414, which pivotally support the planetary gears 410, are pushed by the planetary gears 410 and rotate. Accordingly, the carrier plate 412 at which the carrier shafts 414 are formed rotates.

Due to the carrier plate 412 rotating, the gear 424 formed at the carrier plate 412 rotates. The rotation of the gear 424 is transmitted to the external gear 102 via the gears 432, 434, and thereafter, the clutch 220 and the spool 20 operate in the same way as at the above-described time of normal application of the webbing belt 28. In this way, looseness or so-called "slack" in the webbing belt 28 is eliminated, and the force by which the webbing belt 28 restrains the body of the vehicle occupant is improved. Even if the vehicle occupant thereafter carries out the operation of suddenly braking the vehicle such that a state of rapid deceleration of the vehicle arises, the webbing belt 28 reliably holds the body of the vehicle occupant.

Here, in this case, due to the engaging claw 472 meshing with the ratchet tooth 420 of the ratchet plate 418 such that the rotation of the ratchet plate 418 is restricted, the planetary gears 410 directly rotate the carrier plate 412, which is different than the above-described time of normal application of the webbing belt 28. Thus, the rotation of the motor 44 can be quickly and reliably transmitted to the external gear 102 of the clutch 220, and in this sense as well, the torque of the motor 44 can be reliably transmitted to the spool 20.

On the other hand, even when the force by which the webbing belt 28 restrains the body of the vehicle occupant is improved as described above, it is not preferable that the restraining force is greater than needed.

In this case, as described above, the planetary gears 410 directly rotate the carrier plate 412. Thus, sliding of the clutch spring 428 does not occur.

However, in the present embodiment, the spring pieces 230, which structure the torque limiter 222, are interposed between the base plate 92 and the external gear 102 forming the clutch 220. The torque of the motor 44 which is transmitted to the external gear 102 is transmitted to the base plate 92 via the torque limiter 222.

Thus, in a state in which the spool 20 cannot rotate and rotation of the base plate 92 is restricted, when the external gear 102 attempts to rotate due to the forward rotational driving force of the motor 44 and the torque of the external gear 102 exceeds the spring forces of the spring pieces 230 forming the torque limiter 222, the engaging portions 106 of the spring pieces 230 come out of the engaging recesses 100. In this way, the connection between the base plate 92 and the external gear 102 is temporarily released, and only the external gear 102 rotates in the take-up direction until the engaging portions 106 enter into the other adjacent engaging recesses 100.

In this way, even in a state in which the planetary gears 410 directly rotate the carrier plate 412, due to the connection between the base plate 92 and the external gear 102 being released, the transmission of the torque of the external gear 102 to the base plate 92, i.e., the transmission of the torque of the motor 44 to the spool 20, is cut-off. Therefore, an increase in the restraining force of the webbing belt 28 can be suppressed.

(Operation of Webbing Retractor 10 when the Approach to an Obstacle is Cancelled)

Explanation will be given of a case in which the approach of the vehicle to an obstacle as described above is cancelled, namely, a case in which the vehicle decelerates or stops and a vehicle which is traveling ahead moves further away or the like. In such a state, the electric signal, which corresponds to the distance to the obstacle and which is outputted from the forward observation sensor 54, is inputted to the ECU 52. When the ECU 52 judges that the distance to the obstacle is not less than the predetermined value, first, the ECU 52 confirms, from the memory or the like, whether or not the current situation is a state in which slack has been eliminated.

When the ECU 52 judges that the distance to the obstacle is not less than a predetermined value and that the current situation is a state in which slack has been eliminated, the ECU 52 outputs a control signal to the driver 46 and applies current to the motor 44 via the driver 46. However, in this case, the current which is made to flow is current in the direction opposite to that of the current which is made to flow when slack is to be eliminated. In this way, the motor 44 is driven to rotate in reverse at a speed that is equal to or greater than a predetermined value, and the gear 56 is rotated in reverse via the output shaft 50. This rotation of the gear 56 is transmitted to the drive gear 404 of the control gear 402, and the drive gear 404 is rotated in a decelerated manner. Moreover, rotation is transmitted to the planetary gears 410 which are meshing with the internal teeth formed at the inner tube portion 408 of the drive gear 404.

On the other hand, in this state, the ECU 52 outputs an energization stop signal to the driver 450, and the driver 450 stops the energization of the solenoid 446. In this way, the magnetic field formed around the solenoid 446 is eliminated, and the attraction based on the magnetic force is eliminated. Accordingly, in this state, due to the urging force of the return spring 462, the plunger 448 is pulled out to the exterior of the solenoid housing 442, the slider 456 moves toward the side opposite the solenoid housing 442, and the cam portion 484 moves away from the region beneath the roller 482.

Due to the cam portion 484 moving away from the region beneath the roller 482, the pawl 466 rotates due to the urging force of the return spring 476, the engaging claw 472 moves away from the outer peripheral portion of the ratchet plate 418, and the meshing of the engaging claw 472 with the ratchet tooth 420 is released. Due to the meshing of the engaging claw 472 and the ratchet tooth 420 being released, the ratchet plate 418 is set in a state in which it can rotate freely.

In this state, due to the reverse rotational driving force of the motor 44, the planetary gears 410 attempt to rotate (revolve) in reverse around the sun gear 422 while rotating (autorotating) in reverse around the carrier shafts 414. Here, as described above, in this state, the ratchet plate 418 is in a state in which it can rotate freely. Accordingly, the sun gear 422 as well is in a state in which it can rotate freely. Thus, the sun gear 422, to which the rotation of the planetary gears 410 is transmitted, rotates around the center shaft 416. Due to the sun gear 422 rotating in this way, the torque, which is received from the internal teeth of the inner tube portion 408 of the drive gear 404, does not contribute to the revolution of the planetary gears 410 around the sun gear 422.

On the other hand, when the drive gear 404, which rotates due to the reverse rotational driving force of the motor 44 as described above, rotates, the inner peripheral portion of the other of the pair of holes 430 rotates, in the direction of rotation of the drive gear 404, the peripheral direction end portion of the clutch spring 428 inserted in that hole 430. The friction between the inner peripheral portion of the clutch spring 428 and the outer peripheral portion of the tube portion 426 which is generated thereby, delays the rotation of the peripheral direction one end side of the clutch spring 428, and the clutch spring 428 tightens around the tube portion 426. In this way, the clutch spring 428 and the tube portion 426, i.e., the carrier plate 412, are substantially frictionally connected.

The carrier plate 412, which is frictionally connected to the clutch spring 428 in this way, rotates together with the drive gear 404, and rotates the gear 424. Due to the the gear 424 rotating, the external gear 102 is rotated in the pull-out direction at a rotational speed that is equal to or greater than a predetermined value. Moreover, the rotation of the external gear 102 in the pull-out direction is transmitted to the base plate 92 via the torque limiter 222, and the base plate 92 is rotated in the pull-out direction at a speed that is equal to or greater than a predetermined value.

In the same way as in the case in which the base plate 92 rotates in the take-up direction at a speed that is equal to or greater than a predetermined value, when the base plate 92 rotates in the pull-out direction at a speed that is equal to or greater than a predetermined value, the base plate 92 rotates in the pull-out direction relative to the inertial plate 260 which is attempting to remain at rest due to inertia. When the base plate 92 rotates by a predetermined amount or more in the pull-out direction relative to the inertial plate 260, the pushing portions 280 formed at the blocks 266 of the inertial plate 260 abut the connecting pieces 254 of the pawls 250.

In this state, when the base plate 92 attempts to rotate further in the pull-out direction relative to the inertial plate 260, the pushing portions 280 push the inclined surfaces 282 of the connecting pieces 254 in the take-up direction. The pushing forces applied to the inclined surfaces 282 act in the take-up direction and toward the inner side in the radial direction of the inertial plate 260 and the base plate 92. The portions of the forces, which portions act toward the radial direction inner side, rotate the pawls 250 in the pull-out direction around the bosses 124.

Due to the pawls 250 rotating in the pull-out direction around the bosses 124, the corner portions of the distal ends 254A abut the outer peripheral portion of the adapter 112. In this state, the pawls 250 rotate together with the base plate 92 in the pull-out direction around the center of the base plate 92, until the pawls 250 abut the external teeth 122 which are adjacent at the pull-out direction sides.

Figure 11:
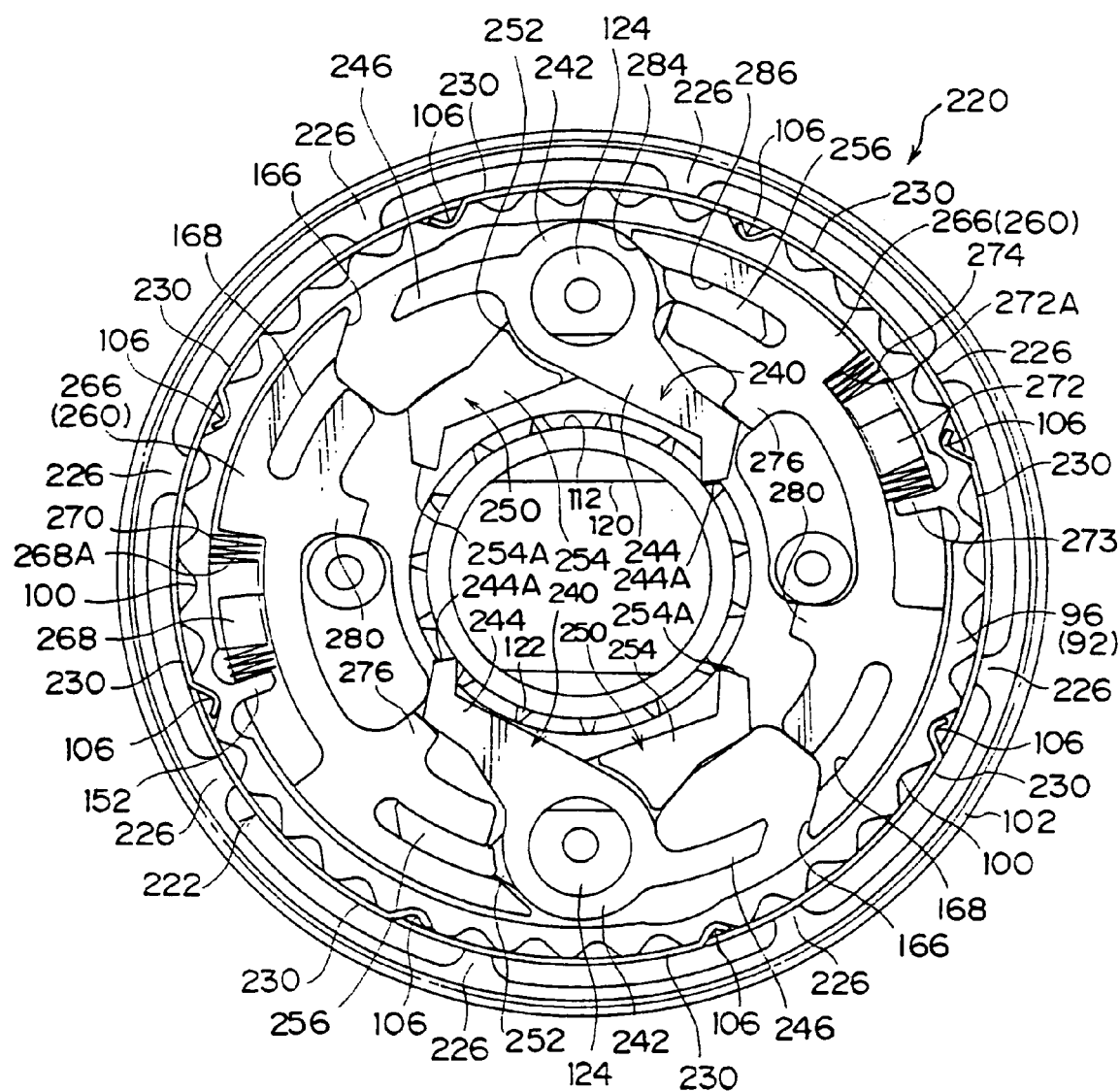
FIG. 11 is a plan view showing a state in which pull-out direction rotation of the clutch of FIG. 9 is being transmitted.

Then, as shown in FIG. 11, in this state, when the distal ends 254A abut the external teeth 122 and the base plate 92 rotates further in the pull-out direction, the distal ends 254A of the pawls 250 push the external teeth 122 in the pull-out direction, and rotate the adapter 112, and accordingly, the spool 20, in the pull-out direction. Due to this rotation of the spool 20, the tight winding of the webbing belt 28 around the spool 20 is loosened, and the pressing sensation applied from the webbing belt 28 to the body of the vehicle occupant is lessened.

In this case, although the direction of rotation is different, the torque controller mechanism 400 carries out the same operation as at the time of normal application of the webbing belt 28. Thus, the webbing belt 28 can be loosened relatively gently. As a result, the vehicle occupant to which the webbing belt 28 is applied does not experience an uncomfortable sensation, as would be the case if the webbing belt 28 were to be loosened suddenly.

On the other hand, in this state, when the motor 44 stops, the rotation of the base plate 92 in the pull-out direction stops. When the rotation of the base plate 92 stops, the compression coil spring 274 pushes the inertial plate 260 in the pull-out direction by urging force, and rotates the inertial plate 260 in the pull-out direction until the position at which the urging force of the compression coil spring 274 and the urging force of the compression coil spring 270 are in balance.

When the inertial plate 260 rotates, the pressing portions 284 abut the releasing pieces 256 of the pawls 250, and push the releasing pieces 256 in the pull-out direction. When the releasing pieces 256 receive this pushing force, the pawls 250 rotate in the take-up direction around the bosses 124, and the distal ends 254A of the connecting pieces 254 move away from the outer peripheral portion of the adapter 112. In this way, the mechanical connection between the base plate 92 and the adapter 112, i.e., the mechanical connection between the output shaft 50 of the motor 44 and the compression coil spring 274, is released.

In this way, regardless of whether the direction is the take-up direction or the pull-out direction, the clutch 220 of the present webbing retractor 10 can transmit the rotation of the external gear 102 to the adapter 112, and conversely, rotation from the adapter 112 is not transmitted to the external gear 102.

Thus, the spool 20 can be rotated both in the take-up direction and in the pull-out direction merely by the motor 44 being driven to rotate forward or driven to rotate in reverse at a speed that is equal to or greater than a predetermined value. In this way, as described above, when the distance between the vehicle and an obstacle is small, the restraining force of the webbing belt 28 can be improved, whereas when the distance between the vehicle and an obstacle is large, the pressing sensation received from the webbing belt 28 can be lessened.

Basically, the transmission of rotation in both directions is realized by providing the pawls 240 which are for transmission of take-up direction rotation, and the pawls 250 which are for transmission of pull-out direction rotation. Thus, the structure of the clutch 220 can be made simple and compact. The present webbing retractor 10 can thereby be made more compact, and the cost thereof can be reduced.

Second Embodiment

Next, a second embodiment of the present invention will be described. The second embodiment which will be described hereinafter is a modified example of the torque control mechanism 400 of the above-described first embodiment. Accordingly, explanation of the basic structure of the webbing retractor 10 and the other portions (such as the clutch 220 and the like) will be omitted.

(Structure of Torque Control Mechanism 510)

Figure 12:
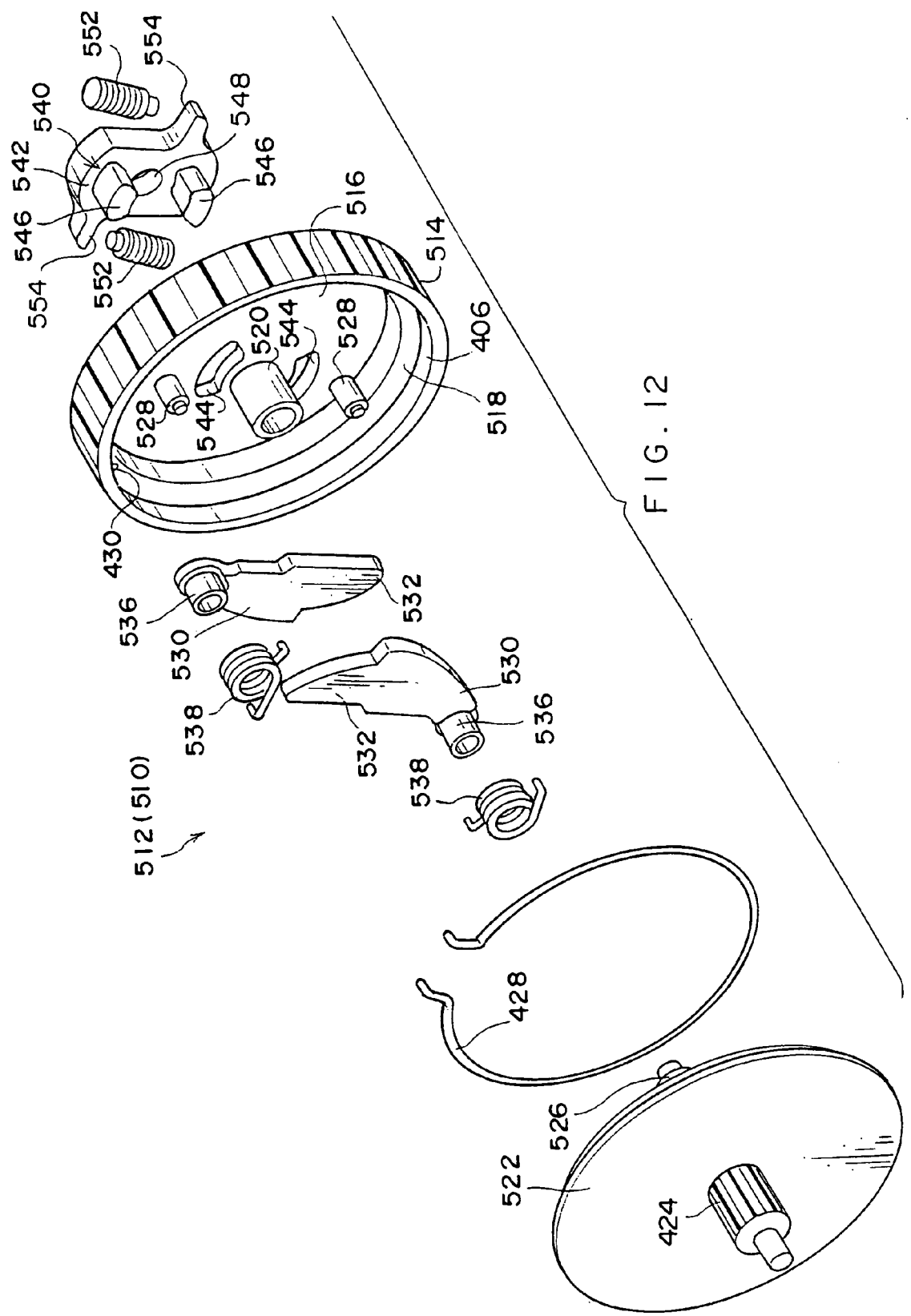
FIG. 12 is an exploded perspective view of a torque control mechanism applied to a second embodiment of the present invention.

The structure of a torque control mechanism 510 in the present embodiment is shown in exploded perspective view in FIG. 12. As is shown in FIG. 12, the torque control mechanism 510 is provided with a control gear 512 in place of the control gear 402. However, the torque control mechanism 510 does not have the control solenoid device 440, nor the driver 450.

Namely, in the above-described first embodiment, the torque control mechanism 400 is structured by the control gear 402 and the control solenoid device 440. However, in the present embodiment, the torque control mechanism 510 is basically structured by only the control gear 512. Although not illustrated, the control gear 512 is provided at the same position as the control gear 402 in FIG. 2.

The control gear 512 has a drive gear 514 serving as a first rotating body. The drive gear 514 is the same as the drive gear 404 with respect to the point that the external teeth formed at the outer tube portion 406 mesh with the gear 56. However, the drive gear 404 in the first embodiment is ring-shaped, whereas the drive gear 514 is formed, on the whole, in the shape of a shallow-bottomed tube whose axial direction dimension is short (or in the shape of a tray). The leg plate 18 side end portion, in the axial direction, of the drive gear 514 is closed by a floor plate 516.

The drive gear 514 has an inner tube portion 518. The inner tube portion 518 is the same as the inner tube portion 408 of the above-described first embodiment in that the inner tube portion 518 is formed at the inner side of the outer tube portion 406 and coaxially with the outer tube portion 406, and in that the axial direction dimension of the inner tube portion 518 is shorter than that of the outer tube portion 406, and in that the holes 430 are formed in one axial direction end surface of the inner tube portion 518. However, the inner tube portion 518 differs from the inner tube portion 408 in that internal teeth are not formed at the inner tube portion 518.

Hollow cylindrical bosses 520 are formed at the substantial center of the floor plate 516 of the drive gear 514, so as to project toward both the leg plate 16 side and the leg plate 18 side. (Only the boss 520 at the leg plate 16 side is shown in FIG. 12.) The bosses 520 pass through so as to be coaxial with one another.

On the other hand, a gear base 522, which is substantially disc-shaped and serves as a second rotating body, is provided coaxially with the drive gear 514 at the open end side of the drive gear 514, so as to close the open end of the drive gear 514. The outer diameter of the gear base 522 is slightly smaller than the inner diameter of the outer tube portion 406.

The gear base 522 enters into the inside of the outer tube portion 406 at the open end side of the drive gear 514.

Figure 13:
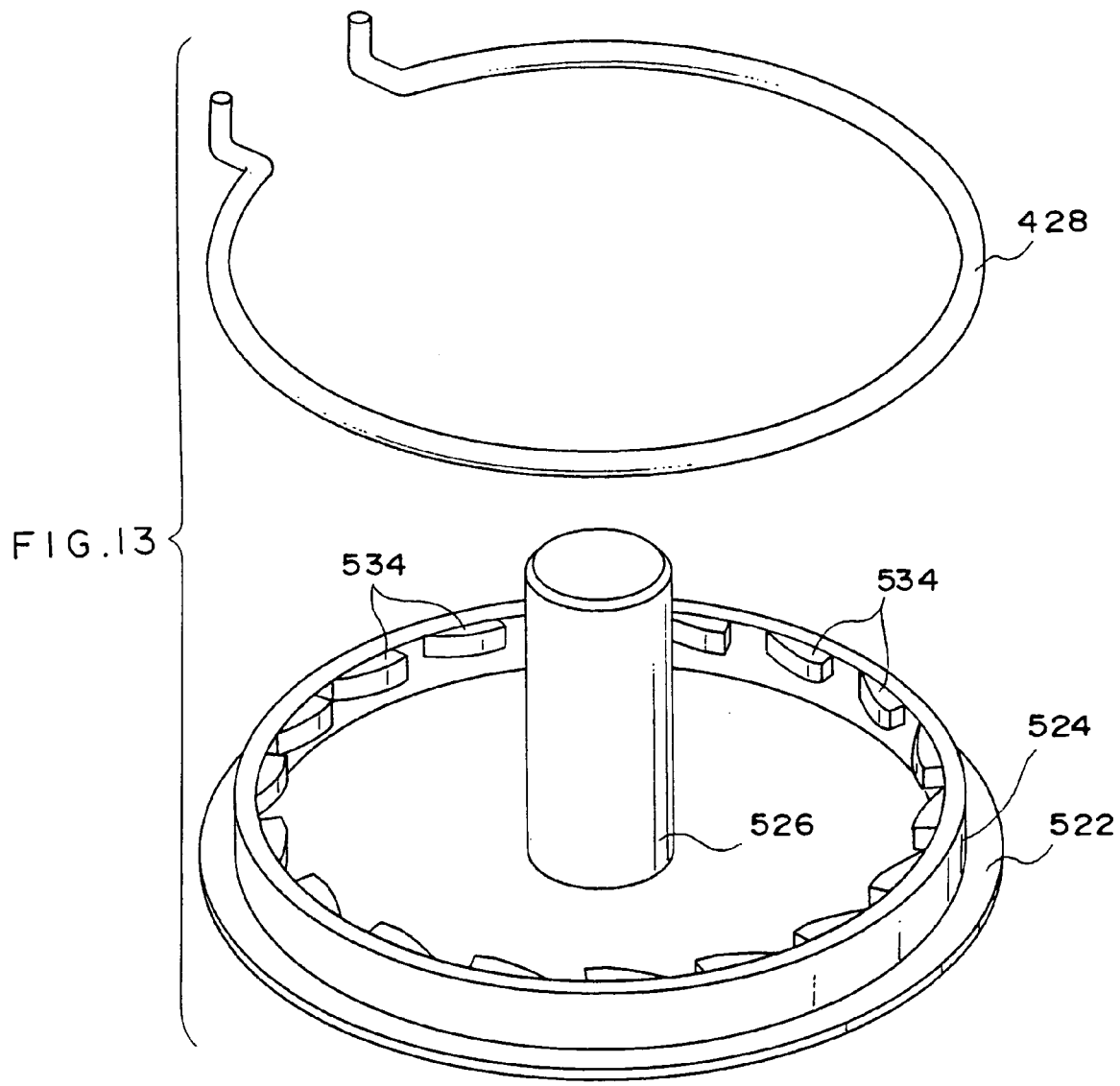
FIG. 13 is a perspective view showing the rear surface side structure of a gear base which serves as a second rotating body structuring a control gear.

A gear 424 is formed integrally and coaxially with the gear base 522 at the leg plate 16 side of the gear base 522. In contrast, as shown in FIG. 13, a tube portion 524 is formed coaxially and integrally with the gear base 522 at the leg plate 18 side of the gear base 522.

The outer diameter of the tube portion 524 is slightly smaller than the inner diameter of the inner tube portion 518. In the state in which the gear base 522 is inserted in the inner side of the outer tube portion 406, the tube portion 524 fits coaxially in the inner side of the inner tube portion 518. The clutch spring 428 is provided at the tube portion 524 in a state of slidingly contacting the outer peripheral portion of the tube portion 524. In the same way as in the first embodiment, the both peripheral direction ends of the clutch spring 428 are fit with play in the holes 430.

A rotating shaft 526 is formed at the leg plate 18 side of the gear base 522, coaxially and integrally with the gear base 522. The rotating shaft 526 is pivotally supported at the boss 520. In this way, the gear base 522 and the drive gear 514 can rotate coaxially and relatively.

Figure 14:
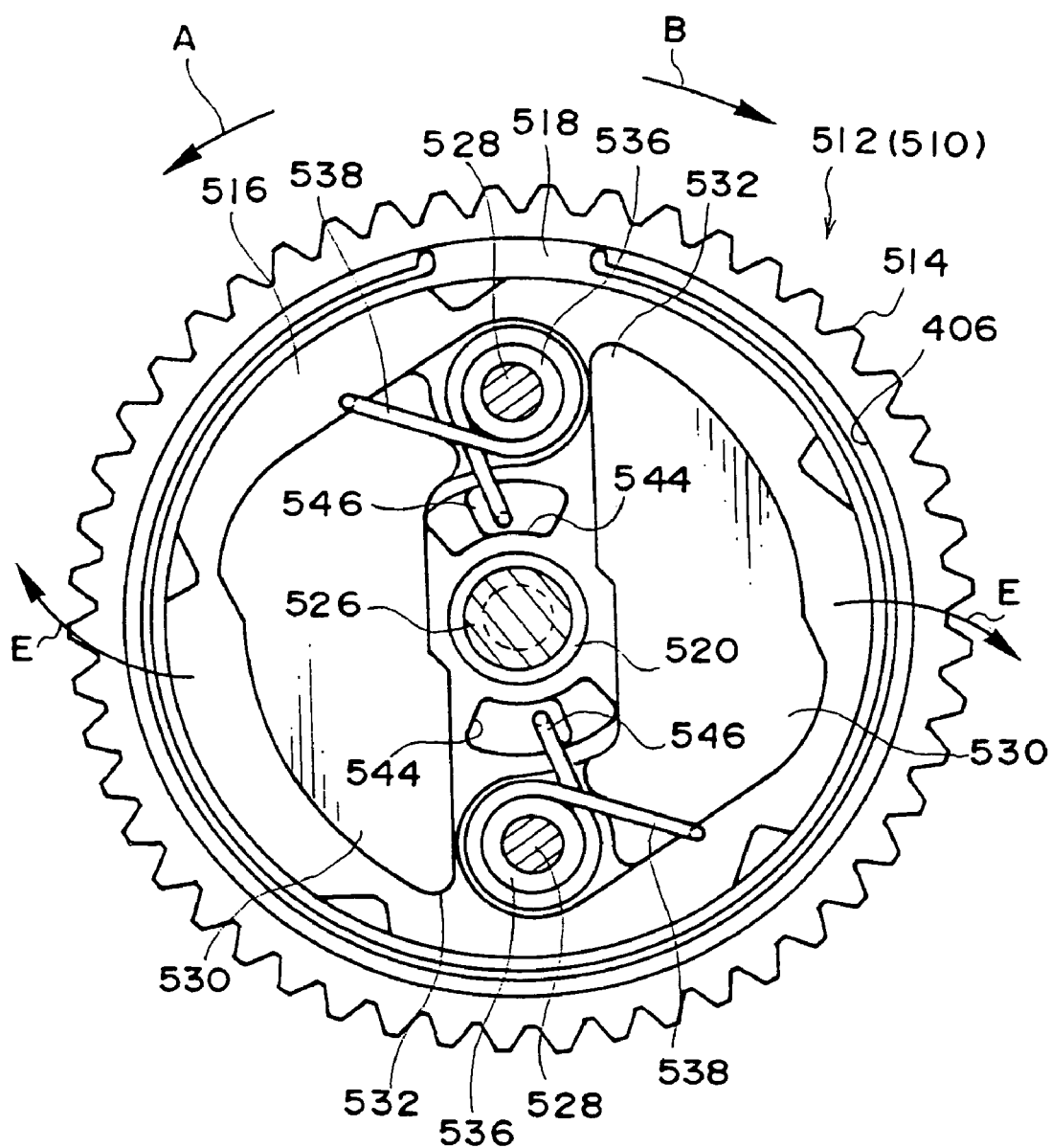
FIG. 14 is a front view showing the structure of the control gear structuring the torque control mechanism applied to the second embodiment of the present invention.
Figure 15:
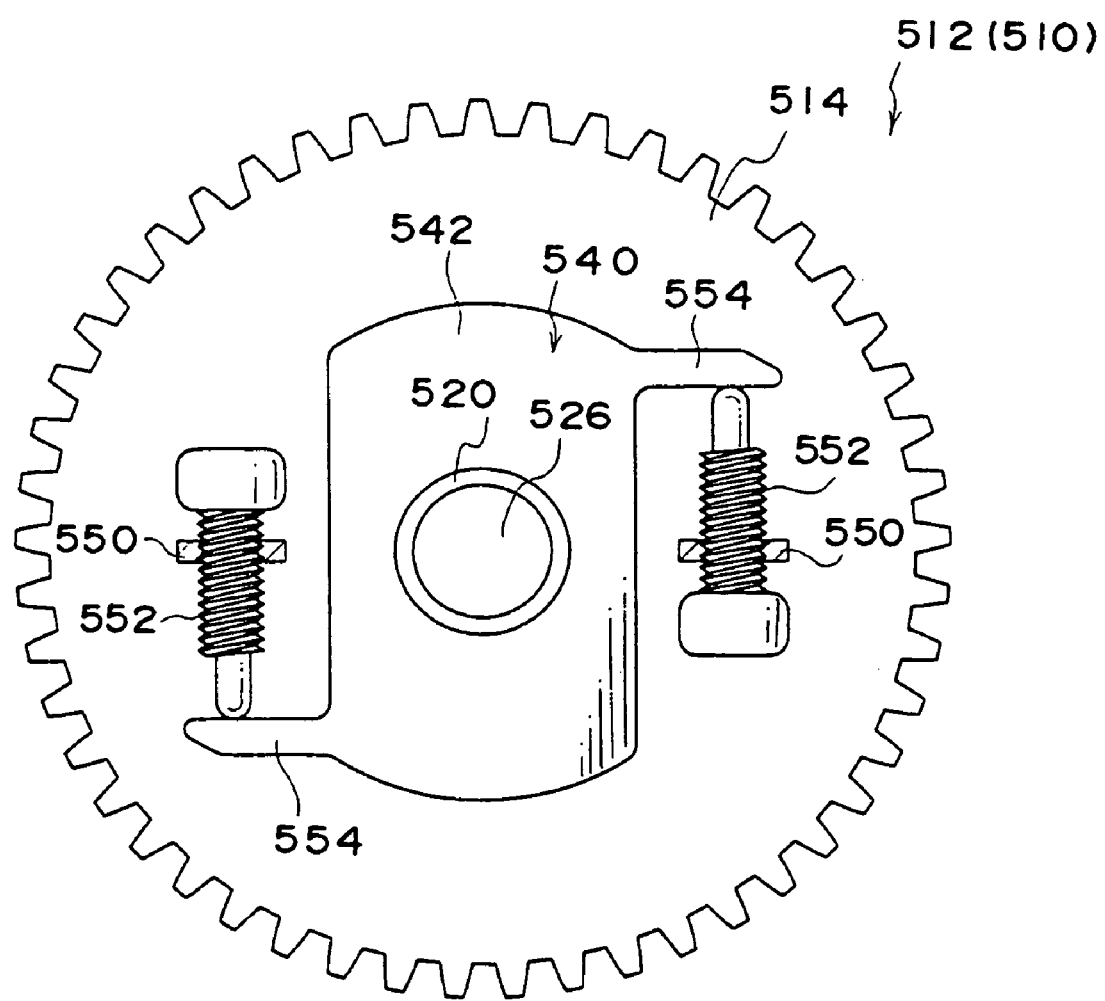
FIG. 15 is a rear view showing the structure of the control gear structuring the torque control mechanism applied to the second embodiment of the present invention.

On the other hand, a pair of supporting shafts 528 stand erect toward the leg plate 16 side at the floor plate 516 of the drive gear 514. The supporting shafts 528 are formed so as to oppose one another across the boss 520. Inertial engaging plates 530 serving as first rotation transmitting members are pivotally supported at the supporting shafts 528 so as to be freely swingable around the supporting shafts 528. An engaging claw 532 is formed at the end portion of the inertial engaging plate 530 at the outer side in the direction of the radius of swinging thereof. When the inertial engaging plate 530 swings over a predetermined distance in the direction of arrow E in FIG. 14, the engaging claw 532 meshes with a ratchet tooth 534 formed at the inner peripheral portion of the tube portion 524.

A spring attachment portion 536 is formed at the inertial engaging plate 530. A torsion coil spring 538 is attached at the spring attachment portion 536. One end of the torsion coil spring 538 is anchored on an adjusting claw 546 which will be described later, whereas the other end of the torsion coil spring 538 is anchored on the inertial engaging plate 530. The torsion coil spring 538 urges the inertial engaging plate 530 in the direction opposite to the direction of arrow E in FIG. 14. Accordingly, provided that torque of an extent which resists the urging force of the torsion coil spring 538 is not applied to the inertial engaging plate 530, the inertial engaging plate 530 cannot rotate until the engaging claw 532 meshes with the ratchet tooth 534.

On the other hand, an adjuster plate 540 is disposed at the leg plate 18 side of the floor plate 516. The adjuster plate 540 has a main body 542 which is substantially plate-shaped. A through hole 548 is formed in the main body 542. The inner diameter of the through hole 548 is extremely slightly larger than the outer diameter of the boss 520. The adapter plate 540 is pivotally supported so as to be freely rotatable around the boss 520, in a state in which the boss 520 passes through the through hole 548.

The adjusting claws 546 are formed to project at the floor plate 516 side surface of the main body 542. The adjusting claws 546 pass through holes 544 formed in the floor plate 516, and project toward the gear base 522 side of the floor plate 516. Ones of ends of the torsion coil springs 538 are anchored at the distal end sides of the adjusting claws 546 which project toward the gear base 522 side of the floor plate 516. Due to the adjuster plate 540 rotating around the boss 520 at the outer side of the through hole 548, the one ends of the torsion coil springs 538 are displaced with respect to the other ends thereof. The urging forces of the torsion coil springs 538 can thereby be increased and decreased.

On the other hand, a pair of holding pieces 550 are formed at the leg plate 18 side of the floor plate 516. One of the holding pieces 550 is formed at a side of the boss 520 that is opposite from a side at which the other holding piece 550 is formed. A female screw hole passing through in the direction of thickness is formed in each of the holding pieces 550. The proximal end side of an adjusting screw 552 is screwed into each of these female screw holes. The distal ends of the adjusting screws 552 abut interference plates 554 which extend from the outer peripheral portion of the main body 542 of the adjuster plate 540.

Due to the adjusting screws 552 rotating around their own axial centers, the adjusting screws 552 are displaced along the axial directions thereof. The interference plates 554, which abut the distal ends of the adjusting screws 552, are formed at the adjuster plate 540. Moreover, the urging forces of the torsion coil springs 538 act on the adjuster plate 540 via the adjusting claws 546. Thus, the interference plates 554 press-contact the adjusting screws 552. Accordingly, due to the adjusting screws 552 being rotated and displaced along their axial directions, the adjusting screws 552 can rotate the adjuster plate 540 around the boss 520. In this way, the one ends of the torsion coil springs 538 can be appropriately displaced with respect to the other ends thereof.

Operation and Effects of Second Embodiment

At the control gear 512 (torque control mechanism 510) having the above-described structure, when the forward rotational driving force of the motor 44 is inputted to the drive gear 514 via the output shaft 50 and the gear 56, the drive gear 514 rotates. The centrifugal force generated by the rotation of the drive gear 514 at this time acts, on the inertial engaging plates 530, in directions opposite to the urging forces of the torsion coil springs 538.

Here, when the forward rotational driving force of the motor 44 is less than a predetermined magnitude, the aforementioned centrifugal force cannot resist the urging forces of the torsion coil springs 538. Thus, the engaging claws 532 of the inertial engaging plates 530 do not mesh with the ratchet teeth 534.

In this state, the drive gear 514 rotates around the rotating shaft 526. However, because transmission of torque to the tube portion 524 via the inertial engaging plates 530 is not carried out, the gear base 522 is in a stopped state.

Due to the drive gear 514 rotating in this way, the inner peripheral portion of one of the pair of holes 430 rotates, in the direction of rotation of the drive gear 514, the peripheral direction end portion of the clutch spring 428 which is in that hole 430. As described in the above first embodiment, due to the frictional force which is generated between the clutch spring 428 and the outer peripheral portion of the tube portion 524 due to the one peripheral direction end of the clutch spring 428 being rotated in the direction of rotation of the drive gear 514, a delay in rotation arises at the other peripheral direction end side of the clutch spring 428 with respect to the one peripheral direction end side. The clutch spring 428 thereby tightens around the tube portion 524.

In this way, due to the frictional force between the clutch spring 428 and the tube portion 524 increasing even more, the clutch spring 428 attempts to rotate following the tube portion 524. The clutch spring 428 and the tube portion 524, i.e., the gear base 522, are substantially frictionally connected.

The gear base 522, which is frictionally connected to the clutch spring 428 in this way, rotates together with the drive gear 514, and rotates the gear 424. Moreover, the rotation of the gear 424 is transmitted to the external gear 102 via the gears 432, 434, and the external gear 102 is rotated in the take-up direction at a rotational speed that is equal to or greater than a predetermined value.

In contrast, when the forward rotational driving force of the motor 44 is greater than or equal to a predetermined magnitude, the aforementioned centrifugal force resists the urging forces of the torsion coil springs 538, and the engaging claws 532 of the inertial engaging plates 530 mesh with the ratchet teeth 534. In this way, the engaging claws 532 of the inertial engaging plates 530, which rotate together with the drive gear 514, push the ratchet teeth 534, and directly rotate the tube portion 524, and accordingly, the gear base 522. Moreover, due to this rotation being transmitted to the external gear 102 via the gears 424, 432, 434, the external gear 102 is rotated in the take-up direction at a rotational speed that is equal to or greater than a predetermined value.

In this way, in the present embodiment, when the forward rotational driving force of the motor 44 is less than a predetermined magnitude, the drive gear 514 and the gear base 522 are frictionally connected via the clutch spring 428. When the rotational driving force of the motor 44 is greater than or equal to a predetermined magnitude, the rotation of the drive gear 514 is basically directly transmitted to the gear base 522, although this transmission is via the inertial engaging plates 530.

Namely, in the present embodiment, the mode of transmitting torque from the drive gear 514 to the gear base 522 differs in accordance with the magnitude of the forward rotational driving force of the motor 44. However, the respective modes are the same as in the above-described first embodiment. Accordingly, at the time of normal application of the webbing belt 28, the motor 44 is driven to rotate forward to the extent that the inertial engaging plates 530 do not rotate against the urging forces of the torsion coil springs 538. When the distance to an obstacle ahead is less than a predetermined distance, the motor 44 is driven to rotate forward to the extent that the inertial engaging plates 530 rotate against the urging forces of the torsion coil spring 538. In this way, the same effects as those of the above-described first embodiment can be achieved.

On the other hand, also when the motor 44 is driven to rotate in reverse, the drive gear 514 rotates. However, the direction of the centrifugal force, which acts on the inertial engaging plates 530 due to the rotation of the drive gear 514 at this time, is substantially the same direction as the urging forces of the torsion coil springs 538. Accordingly, the transmission of torque from the drive gear 514 to the gear base 522 when the motor 44 is driven to rotate in reverse becomes a frictional connection via the clutch spring 428, regardless of the magnitude of the reverse rotational driving force. Accordingly, in this case as well, the same effects can be obtained as in the case in the first embodiment where the motor 44 is driven to rotate in reverse and the restraining force of the webbing belt 28 is weakened.

In each of the above-described embodiments, the clutch 220 is provided between the spool 20 and the torque control mechanisms 400, 510. However, the clutch 220 may be omitted. Further, another clutch may be used provided that it can transmit both forward and reverse rotation of the gear 424 to the spool 20.

Moreover, in each of the above-described embodiments, slack is eliminated by the driving force of the motor 44 which serves as a driving mechanism. However, for example, a so-called "pretensioner mechanism" may be used together with the webbing retractor 10 of the present invention. The pretensioner mechanism forcibly rotates the spool 20 in the take-up direction due to the pressure of gas which is generated by a gas generating agent being combusted instantaneously. When the distance to an obstacle ahead of the vehicle is less than a predetermined value, the slack is eliminated by the driving force of the motor 44. Sudden braking or the like thereafter is detected by an acceleration sensor, and the pretensioner mechanism operates so as to even further strengthen the restraining force of the webbing belt.

As described above, in the present webbing retractor, quick and reliable transmission of rotation is possible in a state in which an output shaft of a driving mechanism and a take-up shaft are directly connected by a torque control mechanism. Moreover, if the torque control mechanism releases this state of direct connection, the output shaft of the driving mechanism and the take-up shaft are connected by frictional force, such that the transmission of rotation can be carried out gently.

What is claimed is:

1. A webbing retractor for an elongated, strip-shaped webbing belt used for application to a body of a vehicle occupant riding in a vehicle, the webbing retractor comprising:
    a take-up shaft which is held so as to be rotatable, and to which one end of the webbing belt is anchored, and which winds the webbing belt around the take-up shaft;
    a driving mechanism which has an output shaft, and which, by driving and rotating the output shaft in a predetermined direction, rotates the take-up shaft at least in a take-up direction; and
    a power transmitting mechanism which transmits rotation of the output shaft to the take-up shaft, the power transmitting mechanism having:
        a first connecting mechanism for transmitting, to the take-up shaft, rotation corresponding to the rotation of the output shaft, mechanical connection of the first connecting mechanism to the take-up shaft being switchable; and
        a second connecting mechanism connecting the output shaft and the take-up shaft by a frictional clutch mechanism so as to transmit the rotation of the output shaft to the take-up shaft,
    wherein when the first connecting mechanism is switched so as to connect to the take-up shaft, the first connecting mechanism overrides transmission of power to the take-up shaft by the second connecting mechanism and
    wherein the first connecting mechanism has a first rotating body which is driven to rotate by the rotation of the output shaft; a second rotating body for transmitting rotation to the take-up shaft by receiving rotation of the first rotating body; and a gear train which is disposed so as to be able to transmit rotation of the first rotating body to the second rotating body, when the first connecting mechanism is switched so as to connect to the take-up shaft, the gear train having at least one planetary gear, and due to the planetary gear revolving, the rotation of the first rotating body is transmitted to the second rotating body.

2. The webbing retractor of claim 1, further comprising a switching mechanism for switching connection of the first connecting mechanism to the take-up shaft, wherein the gear train has a sun gear around which the planetary gears can revolve, and due to the switching mechanism being switched such that rotation of the sun gear is restrained, the planetary gear revolves, and the rotation of the first rotating body is transmitted to the second rotating body.

3. The webbing retractor of claim 1, wherein the first rotating body and the second rotating body are supported so as to be able to rotate relative to one another, and said frictional clutch mechanism includes friction member mounted so as to increase frictional force when the first rotating body rotates relative to the second rotating body.

4. A webbing retractor for an elongated, strip-shaped webbing belt used for application to a body of a vehicle occupant riding in a vehicle, the webbing retractor comprising:
- a take-up shaft which is held so as to be rotatable, and to which one end of the webbing belt is anchored, and which winds the webbing belt around the take-up shaft;
- a driving mechanism including an electric motor which has an output shaft, and which, by actuating said electric motor such that said output shaft rotates in a predetermined direction, the take-up shaft at least in a take-up direction; and
- a power transmitting mechanism including a gear train and a clutch which transmits rotation of the output shaft to the take-up shaft, the power transmitting mechanism having:
  - a first connecting mechanism including a first combination of gears in said gear train connecting the output shaft and the take-up shaft while bypassing the clutch so as to transmit the rotation of the output shaft to the take-up shaft without said clutch,
  - a second connecting mechanism including a second combination of gears in said gear train for transmitting rotation corresponding to the rotation of the output shaft to the take-up shaft via said clutch; and
  - a switching mechanism for selectively switching between said first and second connecting mechanisms such that rotation corresponding to the rotation of the output shaft may be transmitted to the take-up shaft either through said first combination of gears or through said clutch and said second combination of said gears.

5. The webbing retractor of claim 4, wherein said second combination of gears of said second connecting mechanism includes all of said first combination of gears of said first connecting mechanism.

6. The webbing retractor of claim 4, wherein said gear train includes planetary gears engaged to a sun gear that is rotatable, and wherein said switching mechanism prevents said sun gear from rotating when said first connecting mechanism is selected.

* * * * *